(12) United States Patent
Messaros et al.

(10) Patent No.: US 9,730,438 B2
(45) Date of Patent: Aug. 15, 2017

(54) CONTAINER APPARATUS

(71) Applicants: Applied Design Corporation, Boulder, CO (US); The United States of America, as Represented by the Secretary of Agriculture, Washington, DC (US)

(72) Inventors: Michael C. Messaros, Erie, CO (US); Grady E. Barfoot, Denver, CO (US); Jonathan C. Fragoso, Thornton, CO (US); Peter J. Savarie, Lakewood, CO (US); William C. Pitt, Middleton, VA (US)

(73) Assignees: Applied Design Corporation, Boulder, CO (US); The United States of America, As Represented by the Secretary of Agriculture, Washington, DC (US)

( * ) Notice: Subject to any disclaimer, the term of this patent is extended or adjusted under 35 U.S.C. 154(b) by 36 days.

(21) Appl. No.: 14/601,210

(22) Filed: Jan. 20, 2015

(65) Prior Publication Data

US 2016/0205920 A1  Jul. 21, 2016

(51) Int. Cl.
*A01M 25/00* (2006.01)

(52) U.S. Cl.
CPC .......... *A01M 25/006* (2013.01); *A01M 25/00* (2013.01); *A01M 25/002* (2013.01)

(58) Field of Classification Search
CPC ..... A01M 23/00; A01M 25/00; A01M 25/002

USPC ................................................... 43/124, 131
See application file for complete search history.

(56) References Cited

U.S. PATENT DOCUMENTS

| 2,373,363 | A | * | 4/1945 | Wellcome | ........... | F41H 13/0006 |
| | | | | | | 102/504 |
| 4,133,137 | A | * | 1/1979 | van Adelsberg | ........ | A01M 1/02 |
| | | | | | | 229/116 |
| 5,315,932 | A | * | 5/1994 | Bertram | .............. | F41H 13/0006 |
| | | | | | | 102/438 |
| 5,813,165 | A | * | 9/1998 | Dougherty, Sr. | ..... | A01M 23/34 |
| | | | | | | 43/42.06 |
| 5,857,281 | A | * | 1/1999 | Bergquist | ............ | A01M 31/008 |
| | | | | | | 239/47 |
| 6,339,897 | B1 | * | 1/2002 | Hayes | ................... | A01M 1/205 |
| | | | | | | 43/125 |

(Continued)

*Primary Examiner* — David Parsley
(74) *Attorney, Agent, or Firm* — Roger A. Jackson

(57) ABSTRACT

A container apparatus for exposing an article to an external environment, the apparatus including a sidewall with an interior having an inner surface, the sidewall terminating in a first margin and an opposing second margin. The container apparatus also includes a capsule having an outer periphery and an inner void holding the article, the outer periphery is slidably engaged to the sidewall inner surface, the capsule having a split boundary separating the capsule into a plurality of partial capsule elements. The capsule having a closed state with the partial capsule elements being adjacent at the boundary while slidably engaged to the sidewall with the void separated from the environment and the capsule being able to have an open state without the slidable engagement as the partial capsule elements are separated at the boundary with the void open to the environment, thus exposing the article to the environment.

15 Claims, 17 Drawing Sheets

(56) References Cited

U.S. PATENT DOCUMENTS

| | | | |
|---|---|---|---|
| 6,675,789 B2* | 1/2004 | Pearce, III | F42B 12/50 102/370 |
| 6,772,694 B1* | 8/2004 | Pearce, III | F42B 12/50 102/370 |
| 7,076,914 B1* | 7/2006 | Howse | A01M 1/02 43/124 |
| 8,024,889 B2* | 9/2011 | Bunker | A01M 1/02 102/367 |
| 2010/0126483 A1* | 5/2010 | Makowski | F41B 15/10 124/5 |

* cited by examiner

CONTAINER APPARATUS

STATEMENT OF UNITED STATES FEDERALLY FUNDED RESEARCH

This invention was made with government support under the Animal and Plant Health Inspection Service (APHIS Agreement No. 11-7415-0842-CA) awarded by the United States Department of Agriculture. The United States government has certain rights in the invention.

RELATED PATENT APPLICATIONS

There are no related patent applications.

TECHNICAL FIELD

The present invention relates generally to the openable container arts. More particularly, the present invention of the container apparatus facilitates selectable deployment of an article disposed within the container apparatus wherein the article is transported to a selected location within the container and then the article is exposed to an external environment outside of the container.

BACKGROUND OF INVENTION

The present invention of the container apparatus addresses broadly a problem in the overpopulation of the invasive brown tree snake that was most likely inadvertently introduced into Guam probably from New Guinea nearly seventy years ago; supposedly via post World War II cargo shipments. Since its introduction, the brown tree snake has colonized the entire island of Guam, at densities of up to about 33 snakes per acre in Guam or approximately 1 to 2 million brown tree snakes inhabit the 200 square mile island of Guam. These venomous brown tree snakes have caused the extinction of most of Guam's native birds, bats, and lizards; also the brown tree snakes are feeding on young poultry and other small livestock; in addition to threatening human health and safety. Further, the brown tree snakes also cause electrical power outages throughout Guam via wiring damage causing millions of dollars in electrical infrastructure structural damages and lost revenue. The desire for practical technology to aerially deliver baits for brown tree snake control is widespread and has existed for decades. Interested parties include the United States Department of Defense, the United States Department of the Interior, the United States Fish and Wildlife Service, the United States Office of Insular Affairs, the United States Department of Agriculture, the Government of Guam, and others.

In answer to the above identified problem; Federal, state, and territorial governments are committed to reducing the brown tree snake population in Guam, thus also helping to prevent the dispersal of brown tree snakes from Guam to adjacent areas and mitigating the negative effects of the brown tree snakes on Guam. The dispersal of brown tree snakes from Guam via the unintentional movement of snakes as a result of shipping or travel is a very real danger to all islands in the Western Pacific basin and sections of the United States mainland.

To prevent the spread of the brown tree snake, the United States Department of Agriculture's Wildlife Services (WS) program partners with the Government of Guam's Department of Agriculture, the United States Department of Defense (DoD), the United States Department of the Interior's (DoI) Office of Insular Affairs, and the United States Fish and Wildlife Service. A variety of brown tree snake control tools and strategies have been employed, including the use of traps, fumigants, hand capture, snake-detector dogs, public education, and an oral toxicant. A particular toxicant, named acetaminophen, was granted a registration by the United States Environmental Protection Agency in 2003 based on research conducted by Wildlife Service National Wildlife Research Center (NWRC) scientists. The acetaminophen toxicant is currently used in bait stations around shipping ports, the airport, and other easily accessible areas of the Guam Island to help eradicate the brown tree snake. The motivation and desire to develop and implement a practical technology to aerially deliver baits for brown tree snake control has existed for decades.

In summary the benefits of eradicating the brown tree snake population in Guam would be;
1. Facilitating the reintroduction of the endangered Guam Rail and other native species extirpated by the brown tree snake and the restoration of Guam's native ecosystems.
2. Reducing the number of brown tree snake bites to humans and pets (Currently, 1 in 10 emergency room visits in Guam are due to a brown tree snake bite.)
3. Reducing power outages and electrical power infrastructure damage from brown tree snakes electrocuting themselves on power lines and other structures (Currently costs Guam $1-4 million in damages and lost productivity annually.)
4. Preventing brown tree snake colonization colonization on Hawaii or other vulnerable islands in the Pacific (The economic costs of potential brown tree snake colonization to the Hawaiian Islands alone are estimated to be as high as $2 billion annually.)
5. Saving millions of dollars in brown tree snake control costs. The current brown tree snake management protocols are primarily based on the use of traps and snake detector dogs. The overall annual budget for research, educational campaigns, and control efforts (trapping, bait stations, snake detector dogs, aerial baiting, etc.) is approximately $7.5 million annually. The use of toxic bait is currently limited because of the cost and ability to reach all the brown tree snakes in an area. Current bait production depends upon manually inserting an acetaminophen pill into a dead mouse and hand placing dead mice in bait stations. In addition, since the brown tree snakes are arboreal (tree dwelling), a large portion of the snakes will not be exposed to the baits on the ground surface. Employment of a cost-effective aerial baiting strategy will significantly reduce the cost of conducting a brown tree snake baiting program. It is estimated that a Guam snake eradication effort would require the delivery of about 5.2 million baits. At an estimated cost of about $0.99 per bait, this effort would be less costly than the currently annual expenses for brown tree snake control on Guam. However, currently, efforts to reduce the brown tree snake population across Guam have been fairly limited because snakes from rugged and remote areas of Guam have been able to successfully repopulate areas that were once cleared.

In looking at the prior art in this area, starting with U.S. Pat. No. 5,813,165 to Dougherty, Sr. disclosed is a biodegradable snake trap suitable for deployment from an aircraft, the snake trap comprising a hook with line attached, embedded in an egg, see FIG. 1. The egg in Dougherty is encased in a frozen fluid and disposed within a container to protect the egg, again see FIG. 1. The snake trap in Dougherty is dropped from an aircraft flying over the area in which the trap is to be deployed wherein a grapple hooks onto tree limbs to prevent the snake trap from falling all the way to the ground, and a descent restrictor slows the rate of aerial descent of the trap. When the frozen fluid melts in Dougherty, the container falls away and exposes the egg, thus attracting snakes, further when a snake swallows and crushes the egg, the hook lodges in the snake's vital organs and kills the snake, again see FIG. 1. In Dougherty, the exposing of the snake bait in the form of an egg is solely based upon the temperature thawing of the egg, thus there is no selectable control on when timing wise that the bait is exposed to the potential snake which may result in wasted bait.

Continuing in the prior art related to ejecting a cartridge not in the snake baiting arts, in U.S. Pat. No. 5,403,225 to Watkins disclosed is an aerial display amusement device that comprises an elongated, hollow tube containing a plurality of pieces of confetti within the hollow interior of a tube. The user in Watkins holds the lower end of the elongated tube and waves the tube forwardly in an arcuate path so as to generate sufficient centrifugal force to eject the confetti out of the tube and upwardly into the air. In the preferred embodiment in Watkins, the pieces of confetti are of four-sided, tetragonal shape, and pluralities of pieces of confetti are stacked in bundles within the tube such that the bundles exit the tube upwardly in the air and then burst into an aerial display of color and motion as the individual confetti pieces fall downwardly. Watkins is a manually operated device; see FIG. 6, whose primary purpose is to widely dispense the confetti from the tetragonal shape and having the confetti stacked in the tube in a manner that the tetragonal shapes are parallel to one another for maximum dispersion upon release from the tube via manual creation of centrifugal force.

Further, in the prior art related to ejecting a cartridge not in the snake baiting arts, in U.S. Pat. No. 6,692,335 to Watkins, disclosed is a non-explosive system for manual hand launching of streamers from a hollow tube comprising; an elongated hollow launching tube having an open end when launching streamers, a plurality of spiral wound streamers positioned in the launching tube, the streamers being positioned in rows along the length of said launching tube, plus at least the streamers in the row closest to the open end having open hollow cores before insertion into the launching tube and having collapsed cores when inserted into the launching tube, as shown in FIGS. 2, 3, and 4. Thus in Watkins, this is to bias the streamers radially outwardly and form a frictional resistance against ejection of the streamers from the tube, and wherein at least the streamers in the row closest to the open end have central axes about which the streamers are wound, and wherein the central axes are oriented parallel to each other, see FIGS. 1 and 6. As opposed to Watkins '225 (confetti launching) this Watkins '335 is operational to focus on the launching of streamers manually which requires a significant amount of exit force emanating from the manually generated centrifugal force which is forced to be higher from the frictional resistance mentioned above, and also the packed streamers should have higher mass or weight the closer they are to the center of manual centrifugal rotation in order for the higher mass streamers to "push out" the lower mass or weight streamers that are farther from the center of manual centrifugal rotation.

Yet, further continuing in the prior art related to ejecting a cartridge not in the snake baiting arts, in U.S. Pat. No. 6,748,870 to Heidenreich, et al., disclosed is an ammunition round assembly having a combustible cartridge. In Heidenreich, in one embodiment, the ammunition round assembly comprises a cartridge body made of a combustible material consumed in combustion upon firing the ammunition round assembly, wherein a base is releasably connected to the cartridge body's bottom end portion. A retention member in Heidenreich is positioned in a locking groove defined by groove in the cartridge body and the base with a projectile being positioned adjacent to the top end portion of the cartridge body, and an attachment sleeve releasably connects the projectile and the cartridge body. The attachment sleeve in Heidenreich has a connection member releasably engaging the connection member on the top end portion of the cartridge body, wherein the attachment sleeve is configured to resist longitudinal motion of the projectile relative to the cartridge body until the ammunition round assembly is fired. Heidenreich is primarily designed for 105 mm cannon rounds to help overcome the problem of a steel cartridge plastically deforming in a cannon barrel due to high internal combustion pressures which caused to steel cartridge to lodge itself, i.e. gutting stuck inside of the cannon barrel after cannon firing.

Next, further continuing in the prior art related to a cartridge that opens about a hinge not in the snake baiting arts, in U.S. Pat. No. 5,842,486 to Davis, et al. disclosed is a hermetically sealed compact case that contains a cosmetic substance. The compact case in Davis includes an integral two-piece insert having a cover piece coupled to a base piece by an integral living hinge, see FIGS. 1, 2, and 6. In Davis, the cover piece of the insert has a circular cavity with a pair of ridges, while the base piece has a peripheral wall that slides within a groove to form a hermetic seal as between a pair of halves of the compact case. As the integral insert in Davis obtains the closed configuration, the evacuated air makes a distinctive audible sound, indicating to the user that the hermetic seal has been established to help ensure that in a closed state the compact case halves have an air tight seal to better preserve the compact case contents from drying out.

What is needed is a container apparatus for improving the way to effectively eradicate the brown tree snake in their arboreal environment using baits. Thus in a broad sense, a delivery apparatus is needed for brown tree snake baits which could be dropped from an aircraft or thrust upward from the ground surface and with the bait becoming entangled in the thicket growth or forest canopy as the bait fell to the ground, being that the brown tree snake is an arboreal species, entanglement in the forest canopy is crucial for effective baiting. In addition to improving the performance of the needed baiting apparatus, the U.S. Department of Agriculture's (USDA) Wildlife Services (WS) brown tree snake control program would also need of a system for mass producing of the bait cartridges (being required in the millions) and an automated device for reliable and systematic aerial delivery of the bait cartridges.

Ideally a biodegradable bait cartridge and delivery system would be utilized that can disperse up to about 4 baits per second desirably resulting in a bait about every 15 meters of lateral forest canopy via helicopter or fixed wing aircraft or alternatively ground surface launching of bait cartridges also resulting in a bait about every 15 meters of lateral forest canopy. The development of a biodegradable bait cartridge and automated aerial bait delivery system would finally allow for large-scale, simultaneous control of brown tree snake populations throughout Guam thereby helping to prevent brown tree snake repopulation.

SUMMARY OF INVENTION

Broadly, the present invention is of a container apparatus for exposing an article to an external environment, the container apparatus including a surrounding sidewall that is about a longitudinal axis, the surrounding sidewall including a first end portion and an opposing second end portion along the longitudinal axis. The surrounding sidewall having an inner surface and an opposing outer surface, with the first end portion terminating in a first aperture defining a first margin portion, and the second end portion terminating in a second aperture defining a second margin portion. Wherein the surrounding sidewall inner surface, the first aperture, and the second aperture defining a sidewall interior of the surrounding sidewall, as differentiated from the external environment outside of the sidewall interior. The surrounding sidewall also having a rotational axis that is perpendicular to the longitudinal axis, the rotational axis is also positioned between the first and second end portions.

Further included in the container apparatus is a clamshell element having an outer periphery and an inner void disposed within the periphery, wherein the outer periphery is slidably engaged to the surrounding sidewall inner surface such that the clamshell element has movement along the longitudinal axis within the sidewall interior. The clamshell element having a split boundary separating the clamshell element into a plurality of partial clamshell elements, wherein a portion of the split boundary is a hinge as between the plurality of partial clamshell elements. The clamshell element having a closed state defined as the plurality of partial clamshell elements being adjacent to one another at the split boundary with the inner void being a closed volume separated from the external environment. The clamshell element having an open state defined as the plurality of partial clamshell elements being partially separated apart from one another at the split boundary being affixed to one another via the hinge with the inner void being an open volume exposed to the external environment. Wherein when the clamshell element has the slidable engagement on the outer periphery to the surrounding sidewall inner surface the clamshell element is in said closed state. Further, when the clamshell element is not slidably engaged on the outer periphery and clear from the surrounding sidewall inner surface, the clamshell element is in the external environment. When the clamshell element is in the external environment it can be in the closed or open state. Wherein operationally, the article is disposed within the inner void with the article isolated from the external environment when the clamshell element is in the closed state and the article being exposed to the external environment when the clamshell element is in the open state being facilitated by the surrounding sidewall inner surface having been forcibly removed in a direction along the longitudinal axis from the clamshell element outer periphery.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
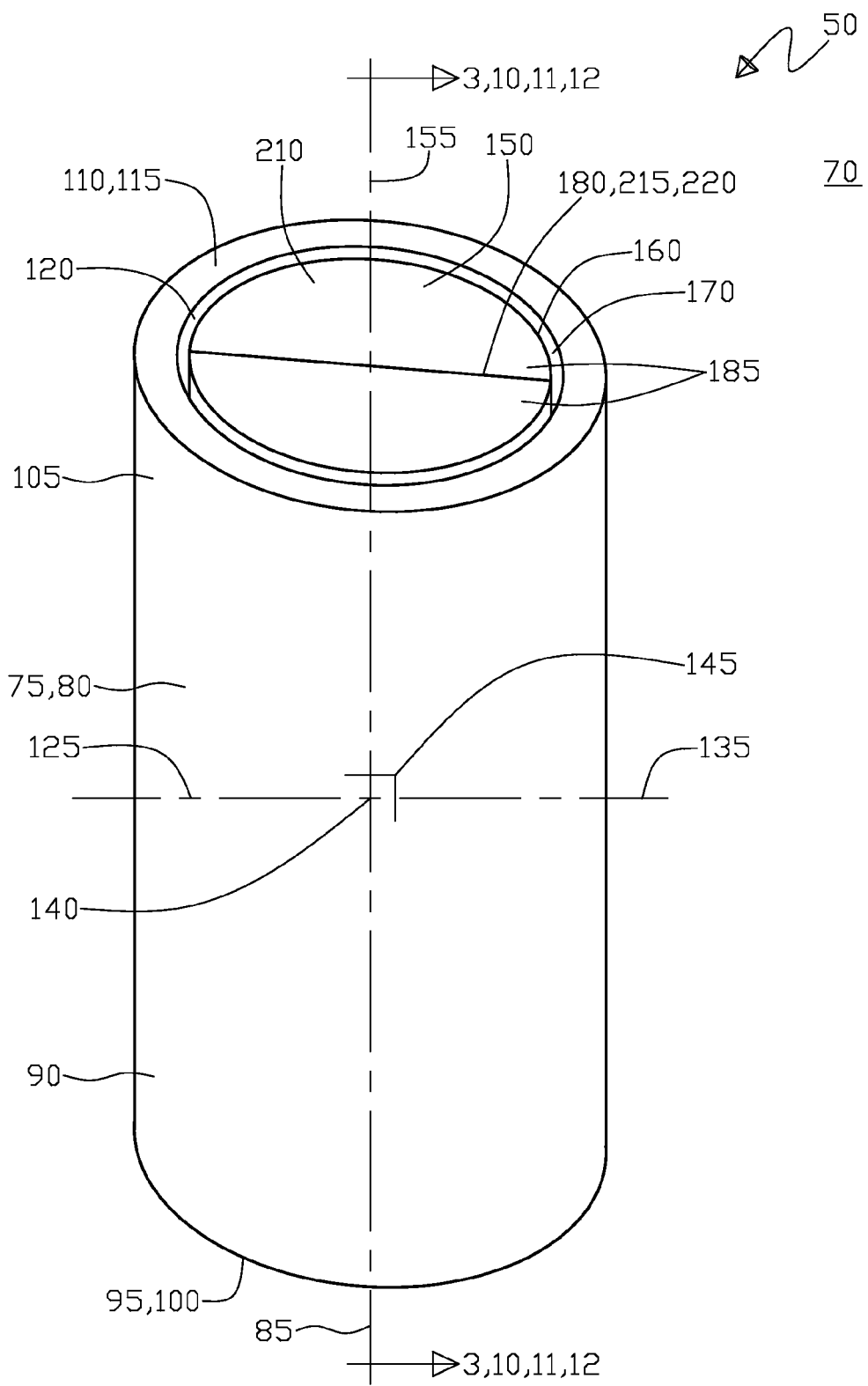
FIG. 1 shows a second end portion perspective view of the of the container apparatus including the external environment, the surrounding sidewall, the longitudinal axis, the first end portion, the second end portion, the second aperture, the second margin, the inner surface, the outer surface, the rotational axis at a mid-point that is perpendicular to the longitudinal axis, the clamshell element in the closed state, the slidable engagement of the clamshell element, the split boundary, and with the partial clamshell elements adjacent at the split boundary having a removable contact.

50 Container apparatus
55 Article
60 Article 55 in the form of a poisoned bait or preferably a mouse pup containing an acetaminophen dose
65 Thicket growth or forest canopy
70 External environment
75 Surrounding sidewall
80 Surrounding sidewall 75 in the form of a cylinder
85 Longitudinal axis of the surrounding sidewall 75
90 First end portion of the surrounding sidewall 75
95 First aperture of the first end portion 90
100 First margin portion of the first aperture 95
105 Second end portion of the surrounding sidewall 75
110 Second aperture of the second end portion 105
115 Second margin portion of the second aperture 110
120 Inner surface of the surrounding sidewall 75

125 Outer surface of the surrounding sidewall 75
130 Interior of the surrounding sidewall 75
135 Rotational axis of the surrounding sidewall 75
140 Position of the rotational axis 135 essentially at a mid-point as between the first 90 and second 105 end portions
145 Perpendicular position of the rotational axis 135 to the longitudinal axis 85
150 Capsule or clamshell element
155 Longwise axis of the capsule or clamshell element 150
160 Outer periphery of the capsule or clamshell element 150
165 Inner void of the capsule or clamshell element 150
170 Slidable engagement of the outer periphery 160 to the inner surface 120 placing the capsule or clamshell element 150 in the closed state 210
175 Movement of the clamshell element 150 relative to the inner surface 120 along the longitudinal axis 85
180 Split boundary of the capsule or clamshell element 150 that can be along the longwise axis 155
185 Partial capsule or clamshell elements that can be a pair of capsule elements or clamshell halves
190 Hinge of the clamshell element 150
195 Mating protrusion of the hinge 190
200 First pivotal axis of the hinge 190
205 Perpendicular position of the first pivotal axis 200 to the longwise axis 155
210 Closed state of the capsule or clamshell element 150
215 Adjacent position of the partial capsule or clamshell elements 185 at the split boundary 180
220 Removable contact of the partial capsule elements or pair of clamshell halves 185 at the split boundary 180
225 Closed volume of the inner void 165 separated from the external environment 70 in the closed state 210 of the capsule or clamshell element 150
230 Open state of the capsule or clamshell element 150
235 Partially separated apart position of the partial capsule elements or partial clamshell elements 185 at the split boundary 180
240 Pivoting apart of the pair of clamshell halves 185 about the first pivotal axis 200
245 Open volume of the inner void 165 that is exposed to the external environment 70 when the capsule or clamshell element 150 is in the open state 230
250 Capsule or clamshell element not slidably engaged 170 on the outer periphery 160 to the inner surface 120 of the surrounding sidewall 75
255 Clearing of the capsule or clamshell element 150 or the outer periphery 160 from the inner surface 120
260 Article 55 disposed within the inner void 165
265 Affixment of the article 55 to a portion of the inner void 165
270 Article 55 isolated from the external environment 70 when the capsule or clamshell element 150 is in the closed state 210
275 Article 55 exposed to the external environment 70 when the capsule or clamshell element 150 is in the open state 230
280 Forcibly removing the inner surface 120 from the outer periphery 160 along the longitudinal axis 85
285 Elongated flexible member
290 Primary end portion of the elongated flexible member 285
295 Secondary end portion of the elongated flexible member 285
300 Mid portion of the elongated flexible member 285
305 Disposing of the elongated flexible member 285 between the inner surface 120 and the outer periphery 160

310 Affixment of the primary end portion 290 to the surrounding sidewall 75
315 Affixment of the secondary end portion 295 to the clamshell element 150
320 Flexible tether of the elongated flexible member 285 as between the surrounding sidewall 75 and the capsule or clamshell element 150
325 Length of the elongated flexible member 285
330 Distance of the flexible tether 320 as between the surrounding sidewall 75 and the capsule or clamshell element 150
335 Silhouette of the surrounding sidewall 75, the elongated flexible member 285, and the capsule or clamshell element 150
340 Entanglement of the container apparatus 50 in the thicket growth 65 that includes the surrounding sidewall 75, the elongated flexible member 285, and the capsule or clamshell element 150
345 Elongated flexible member 285 in the form of a planar strip
350 Wound form of the planar strip 345 about the outer periphery 160
355 Spiral form of the wound form 350
360 Helical spiral form of the spiral form 355
365 Helical spiral 360 wound in a direction progressing along the longitudinal axis 85 from the first margin 100 to the second margin 115
370 Cover
375 Affixing of the cover 370 to the first margin portion 100
380 Resting removable contact of the capsule or clamshell element 150 or the hinge 190 as against the cover 370
385 Resting removable engagement contact of the mating protrusion 195 of the hinge 190 to the cavity 435 of the dome shaped 410 cover 370
390 Exiting of the capsule or clamshell element 150 therethrough the second aperture 110
395 Unwinding or un-spiraling of the spiral form 355 of the planar strip 345
400 Unwinding or un-spiraling of the spiral form 355 of the planar strip 345 progressively away from the hinge 190
405 Separation of the surrounding sidewall 75 and the capsule or clamshell element 150
410 Dome shape of the cover 370
415 Projection inwardly of the dome shape 410 toward the sidewall interior 130
420 Cover 370 disposed within a portion of the sidewall interior 130
425 Affixment of the cover 370 to a portion of the inner surface 120
430 Affixment of the planar strip 345 primary end portion 290 to the cover 370
435 Cavity of the cover 370 dome shape 410 for receiving the mating protrusion 195 of the hinge 190
440 Offset axial position of the closed state 210 capsule or clamshell element 150 from the cover 370 for the capsule or clamshell element 150 that is disposed within a portion of the interior 130 along the longitudinal axis 85 and the offset 440 being about the rotational axis 135
445 Initial rotation of the surrounding sidewall 75 about the rotational axis 135
450 Centrifugal force causing the capsule or clamshell element 150 to dislodge from the surrounding sidewall 75 second aperture 110
455 Un-spiraling of the planar strip 345 into the tether 320
460 Substantially taut position of the tether 320
465 Method of displacing the poisoned bait 60 in a selected thicket growth 65 in the external environment 70

470 Deploying the container apparatus 50 to have the initial rotation 445 about the rotational axis 135
475 Deploying the container apparatus 50 to have the initial rotation 445 about the rotational axis 135 from an aircraft 485 flying over a selected thicket growth 65
480 Deploying the container apparatus 50 to have the initial rotation 445 about the rotational axis 135 from a ground position 490 adjacent to a selected thicket growth 65
485 Aircraft
490 Ground position

DETAILED DESCRIPTION

With initial reference to FIG. 1 shown is a second end portion 105 perspective view of the of the container apparatus 50 including the external environment 70, the surrounding sidewall 75, the longitudinal axis 85, the first end portion 90, the second end portion 105, the second aperture 110, the second margin 115, the inner surface 120, and the outer surface 125. Further FIG. 1 shows the rotational axis 135 at a mid-point 140 that is perpendicular 145 to the longitudinal axis 85, plus the clamshell element 150 in the closed state 210, the slidable engagement 170 of the clamshell element 150, the split boundary 180, and with the partial clamshell elements 185 adjacent at the split boundary 180 having a removable contact 220.

Figure 2:
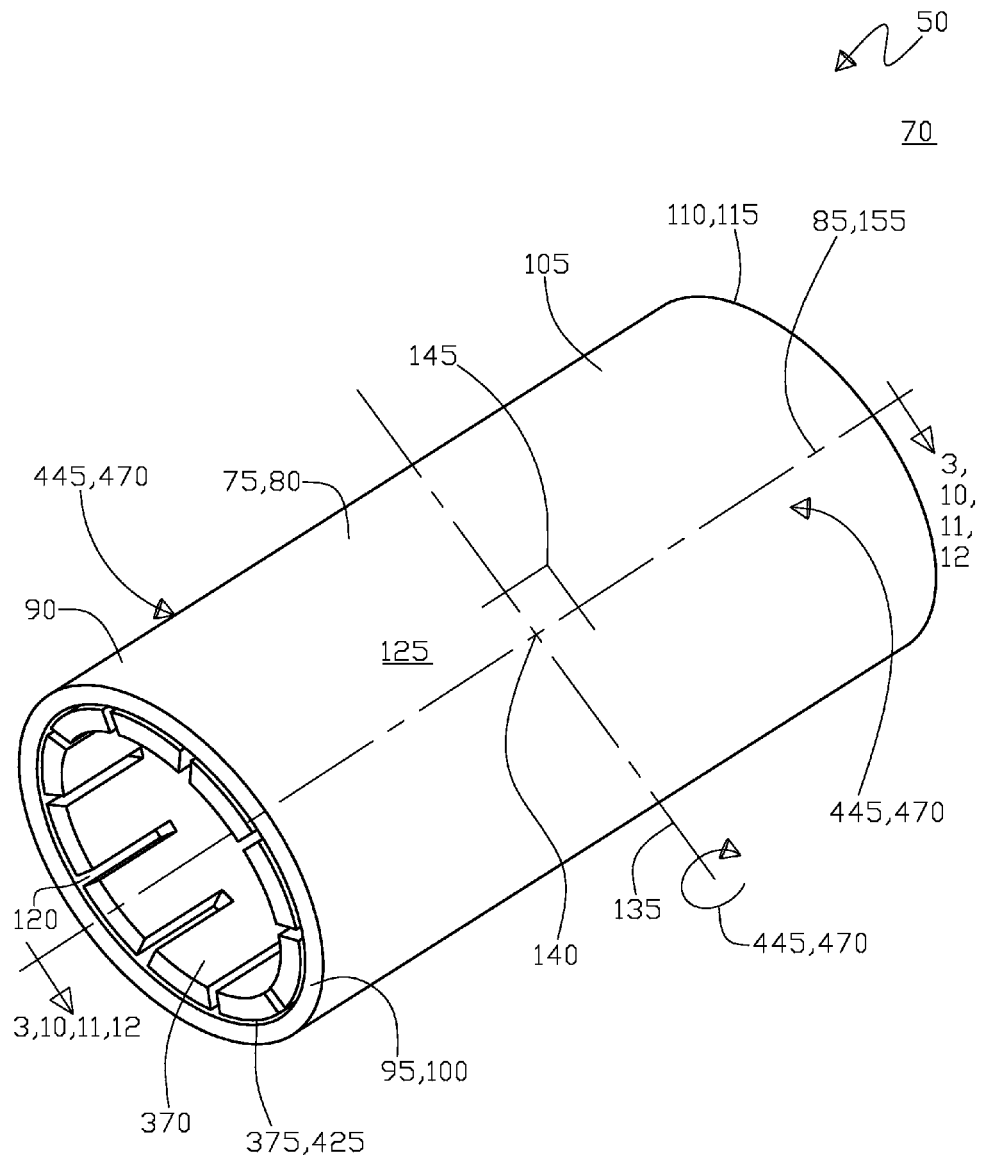
FIG. 2 shows a first end portion perspective view of the of the container apparatus including the external environment, the surrounding sidewall, the longitudinal axis, the first end portion, the second end portion, the first aperture, the first margin, the inner surface, the outer surface, the rotational axis at a mid-point that is perpendicular to the longitudinal axis, the cover affixed to the first margin portion, a dome shape of the cover, an inward projection of the dome shape toward the sidewall interior as the cover is disposed within a portion of the sidewall interior, affixment of a portion of the cover to the inner surface.

Continuing, FIG. 2 shows the first end portion 90 perspective view of the of the container apparatus 50 including the external environment 70, the surrounding sidewall 75, the longitudinal axis 85, the first end portion 90, the second end portion 105, the first aperture 95, the first margin 100, the inner surface 120, and the outer surface 125. FIG. 2 also shows the rotational axis 135 at the mid-point 140 that is perpendicular 145 to the longitudinal axis 85, the cover 370 affixed 375 to the first margin portion 100, a dome shape 410 of the cover 370, an inward projection 415 of the dome shape 410 toward the sidewall interior 130 as the cover 370 is disposed 420 within a portion of the sidewall interior 130, and an affixment 425 of a portion of the cover 370 to the inner surface 120.

Figure 3:
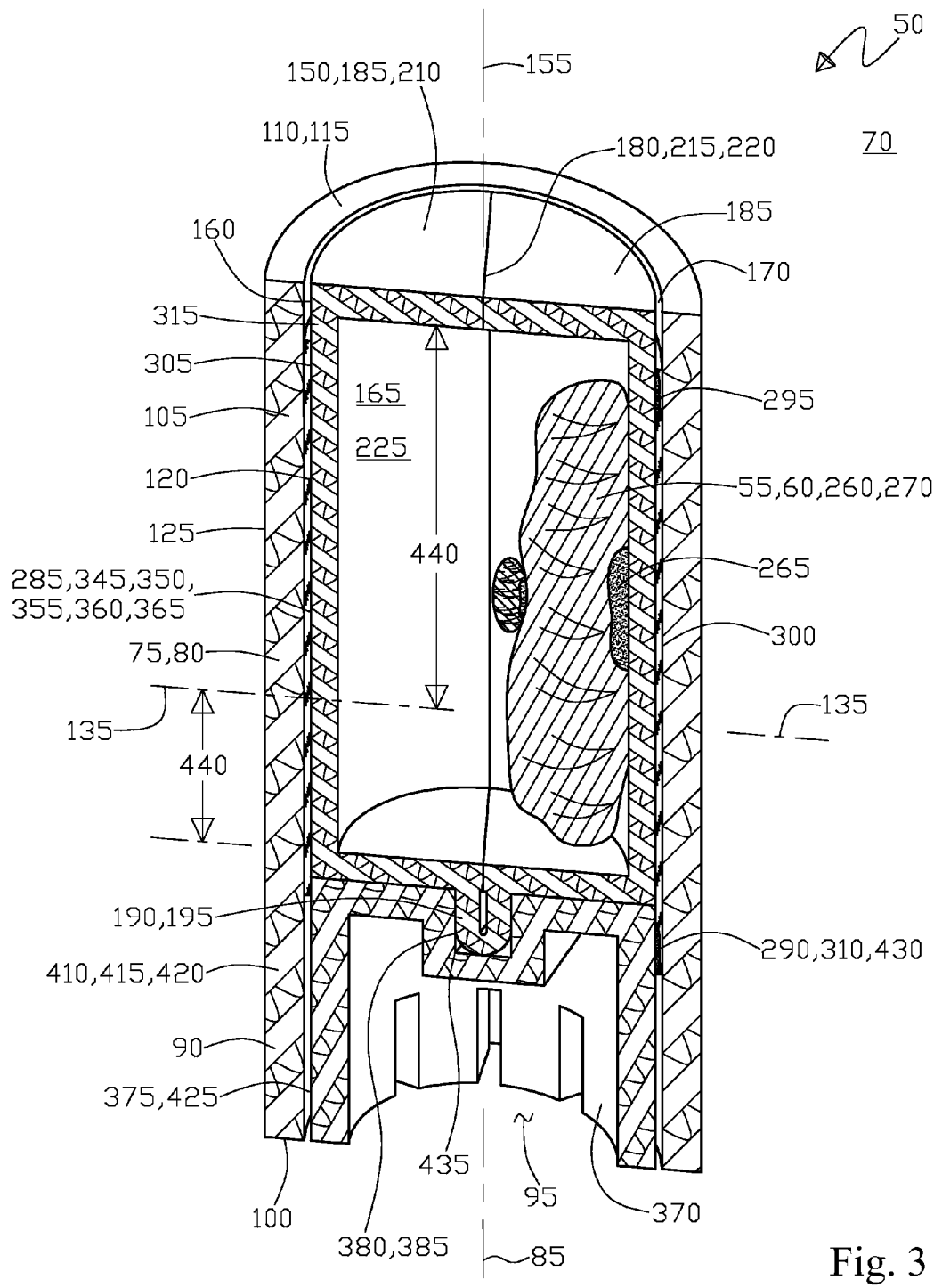
FIG. 3 shows cross sectional view 3-3 from both FIGS. 1 and 2, showing the entire container apparatus including the external environment, the surrounding sidewall, the longitudinal axis, the first end portion, the first aperture, the first margin, the second end portion, the second aperture, the second margin, the inner surface, the outer surface, the rotational axis with an offset axial position of the clamshell element, the clamshell element in the closed state, the slidable engagement of the clamshell element, the split boundary, and with the partial clamshell elements adjacent at the split boundary having a removable contact with one another, the cover affixed to the first margin portion, a dome shape of the cover, an inward projection of the dome shaped cover toward the sidewall interior as the cover is disposed within a portion of the sidewall interior, affixment of a portion of the cover to the inner surface, a longwise axis of the clamshell element, the outer periphery, the inner void, the slidable engagement, a hinge, a mating protrusion of the hinge, a closed volume of the inner void, the article disposed as a poisoned bait within the inner void, affixment of the article to the inner void, the article isolated from the external environment, and a resting removable contact in the form of a removable engagement of the clamshell element at the hinge against the cover.

Next, FIG. 3 shows cross sectional view 3-3 from both FIGS. 1 and 2, showing the entire container apparatus 50 including the external environment 70, the surrounding sidewall 75, the longitudinal axis 85, the first end portion 90, the first aperture 95, the first margin 100, the second end portion 105, the second aperture, the second margin 115, the inner surface 120, the outer surface 125, the rotational axis 135 with an offset 440 axial position of the clamshell element 150 along the longitudinal axis 85 of the surrounding sidewall 75. FIG. 3 also shows the clamshell element 150 in the closed state 210, the slidable engagement 170 of the clamshell element 150, the split boundary 180, and with the partial clamshell elements 185 adjacent 215 at the split boundary 180 having a removable contact 220 with one another.

FIG. 3 further shows the cover 370 affixed 375 to the first margin portion 100, a dome shape 410 of the cover 370, an inward projection 415 of the dome shaped 410 cover 370 toward the sidewall interior 130 as the cover 370 is disposed 420 within a portion of the sidewall interior 130, affixment 425 of a portion of the cover 370 to the inner surface 120. Also shown in FIG. 3 is the a longwise axis 155 of the clamshell element 150, the outer periphery 160, the inner void 165, the slidable engagement 170, a hinge 190, a mating protrusion 195 of the hinge 190, a closed volume 225 of the inner void 165, with the article 55 disposed as a poisoned bait 60 within the inner void 165, and affixment of the article 55 to the inner void 165. With FIG. 3 showing the article 55 isolated from the external environment 70, and a resting removable contact 380 in the form of a removable engagement 385 of the clamshell element 150 at the hinge 190 against the cover 370.

Figure 4:
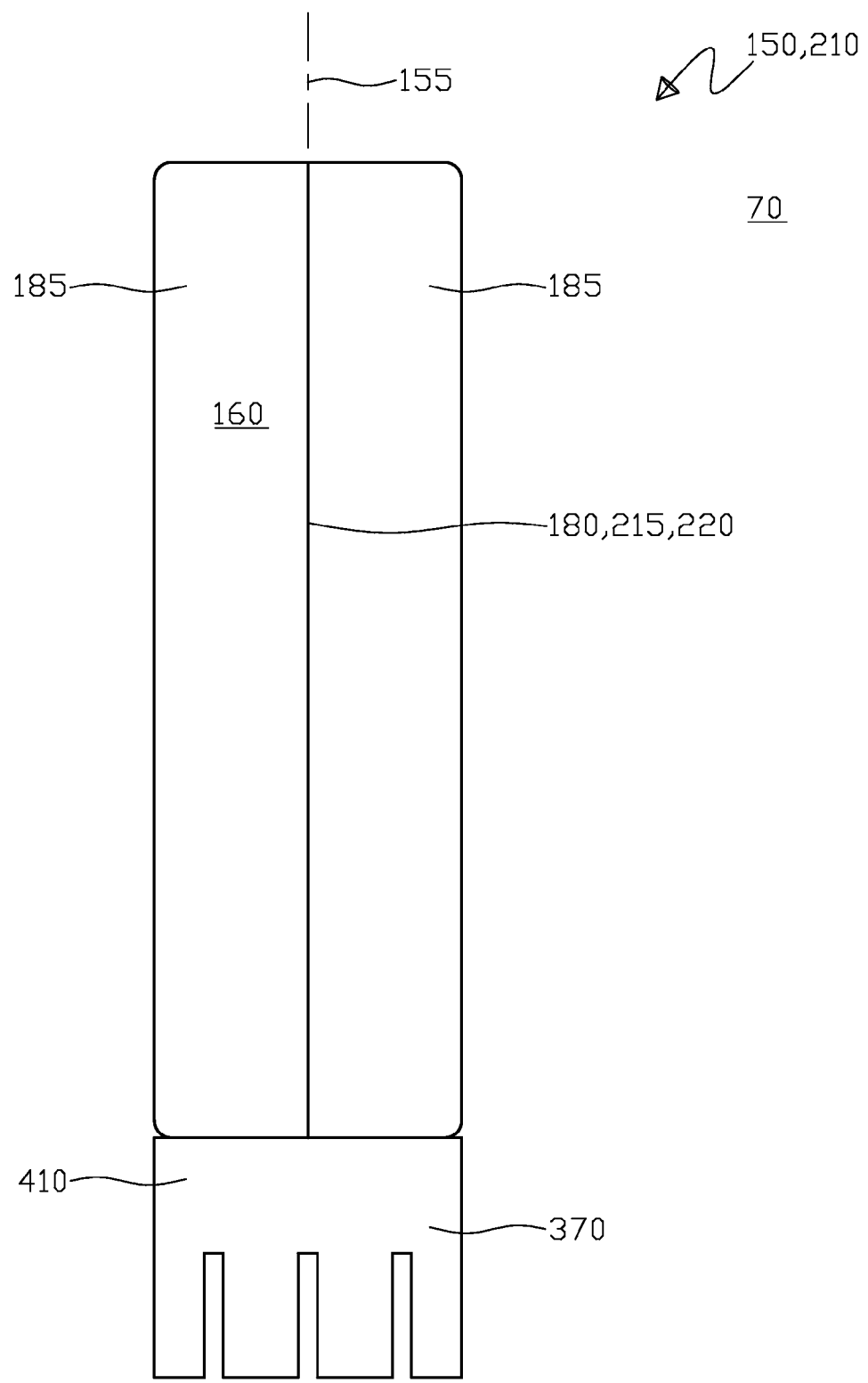
FIG. 4 shows a side elevation view of the clamshell element in the closed state with the resting removable contact in the form of the removable engagement of the clamshell element at the hinge against the cover with the surrounding sidewall removed, also shown is the split boundary with the partial clamshell elements adjacent at the split boundary having a removable contact with one another, and the longwise axis.

Next, FIG. 4 shows a side elevation view of the clamshell element 150 in the closed state 210 with the resting removable contact 380 in the form of the removable engagement 385 of the clamshell element 150 at the hinge 190 against the cover 370 with the surrounding sidewall 75 removed, also shown is the split boundary 180 with the partial clamshell elements 185 adjacent 215 at the split boundary 180 having a removable contact 220 with one another, and the longwise axis 155.

Figure 5:
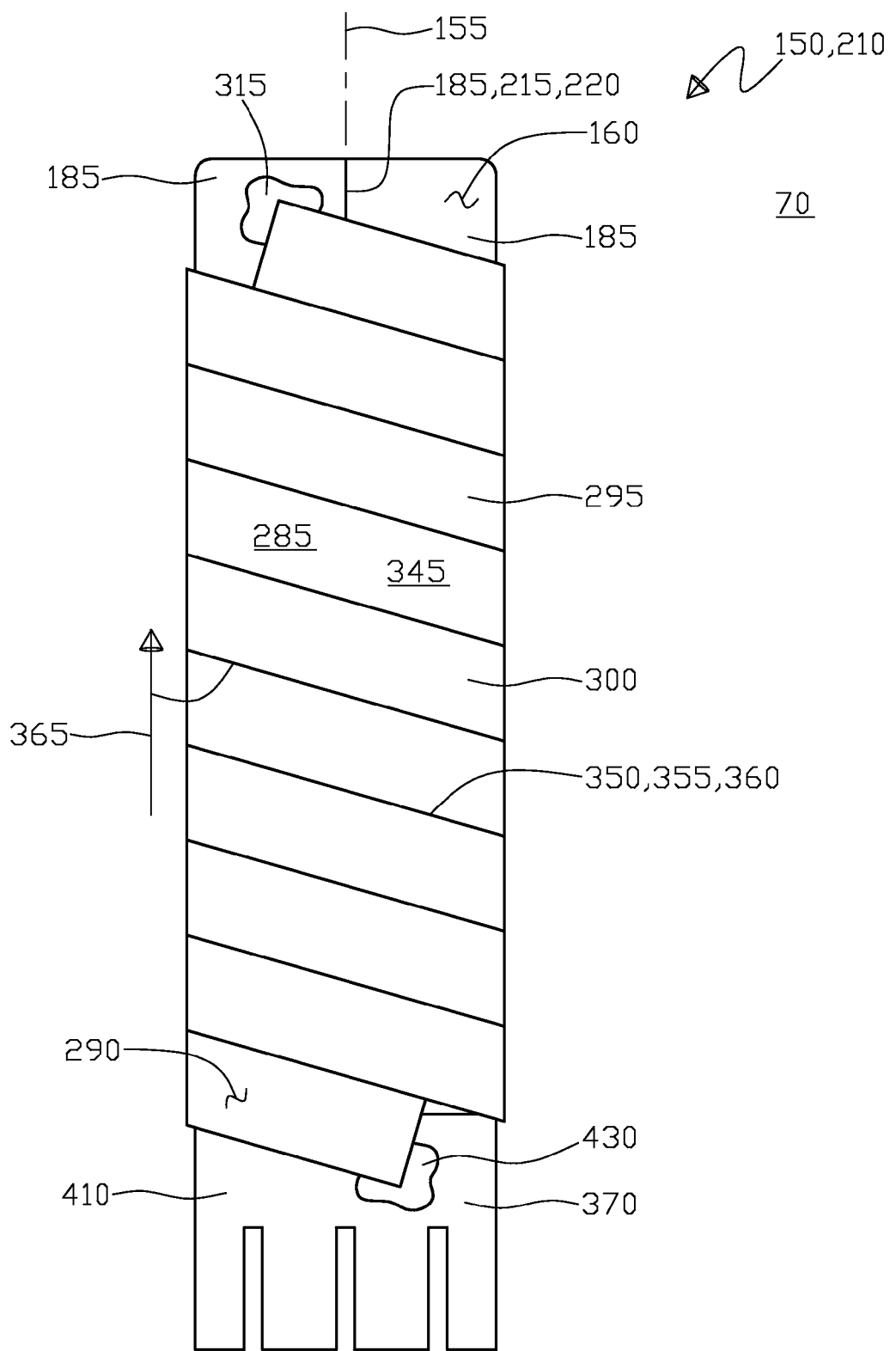
FIG. 5 shows the side elevation view of the clamshell element in the closed state with the resting removable contact in the form of the removable engagement of the clamshell element at the hinge against the cover with the surrounding sidewall removed, also shown is the split boundary with the partial clamshell elements adjacent at the split boundary having a removable contact with one another, and the longwise axis all as depicted in FIG. 4 with the addition of an elongated flexible member in the form of a planar strip that includes a primary end portion, a secondary end portion, a mid-portion of the elongated flexible member, affixment of the primary end portion to the cover, affixment of the secondary end portion to the clamshell element, and a wound form of a helical spiral of the elongated flexible member about the outer periphery in a direction from the first margin (not shown) to the second margin (not shown)

Continuing, FIG. 5 shows the side elevation view of the clamshell element 150 in the closed state 210 with the resting removable contact 380 in the form of the removable engagement 385 of the clamshell element 150 at the hinge 190 against the cover 370 with the surrounding sidewall removed 75, also shown is the split boundary 180 with the partial clamshell elements 185 adjacent 215 at the split boundary 180 having a removable contact 220 with one another, and the longwise axis 155 all as depicted in FIG. 4. Thus FIG. 5 has the addition of an elongated flexible member 285 in the form of a planar strip 345 that includes a primary end portion 290, a secondary end portion 295, a mid-portion 300 of the elongated flexible member 285, affixment 430 of the primary end portion 290 to the cover 370, affixment 315 of the secondary end portion 295 to the clamshell element 150. Also, FIG. 5 shows a wound form 350 of a helical 360 spiral 355 of the elongated flexible member 285 about the outer periphery 160 in a direction from the first margin 100 (not shown) to the second margin 115 (not shown).

Figure 6:
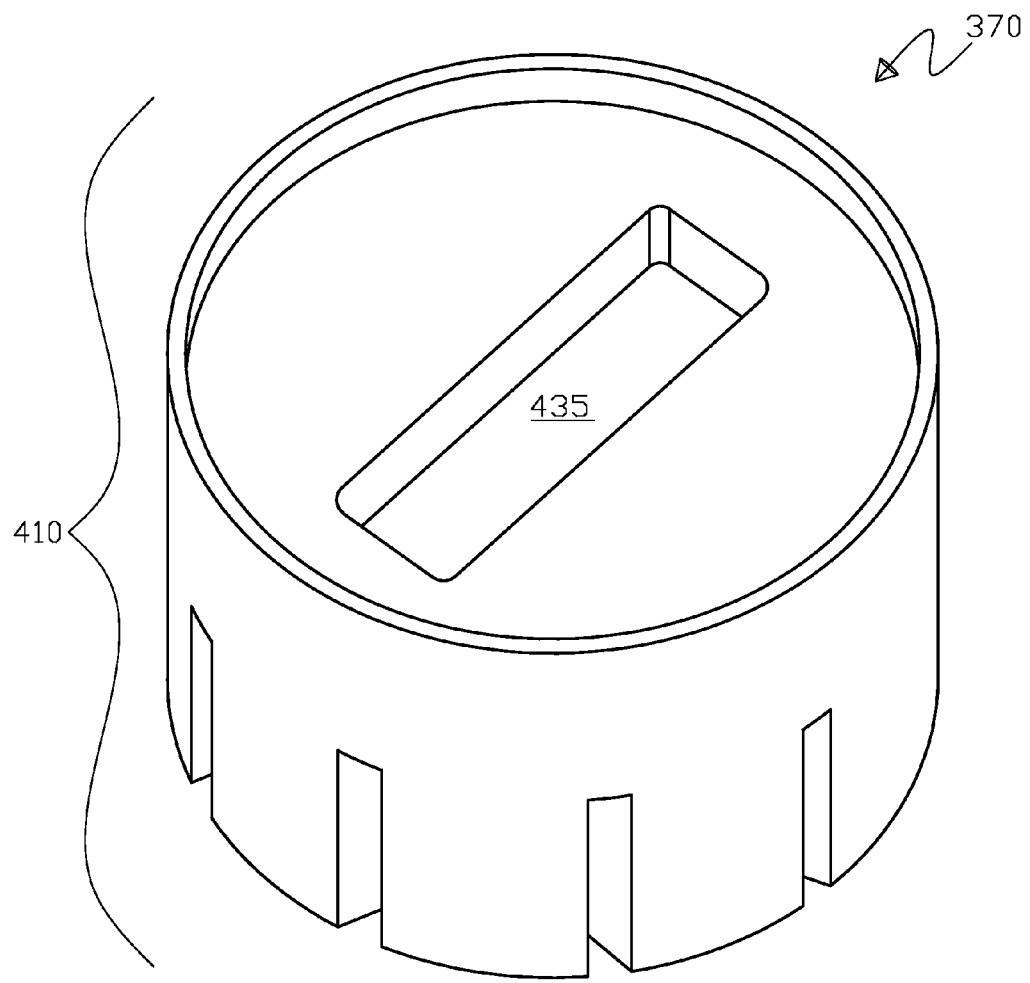
FIG. 6 shows a perspective view of the cover and in particular a cavity disposed within the cover, and the dome shape of the cover.
Figure 7:
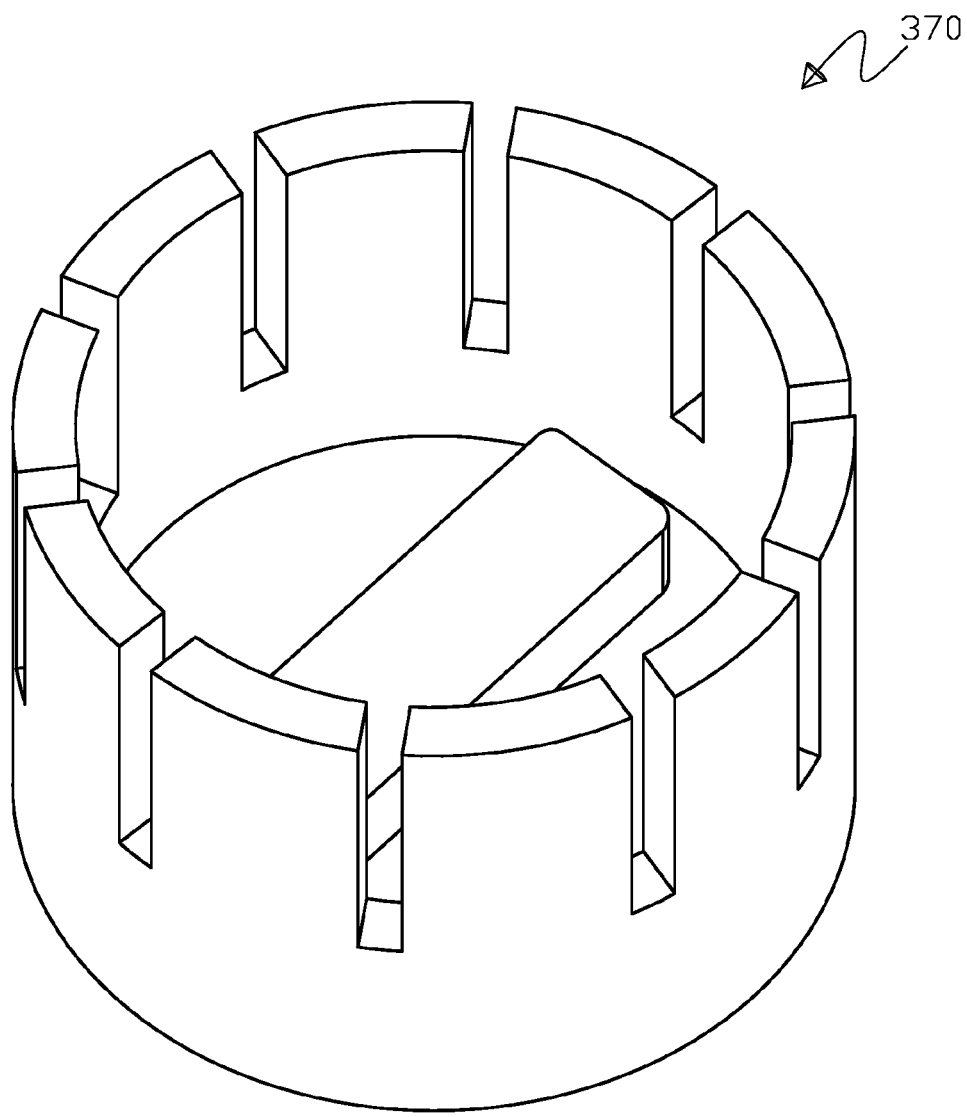
FIG. 7 shows a perspective view of the cover that is opposing to FIG. 6, and in particular the dome shape of the cover.
Figure 8:
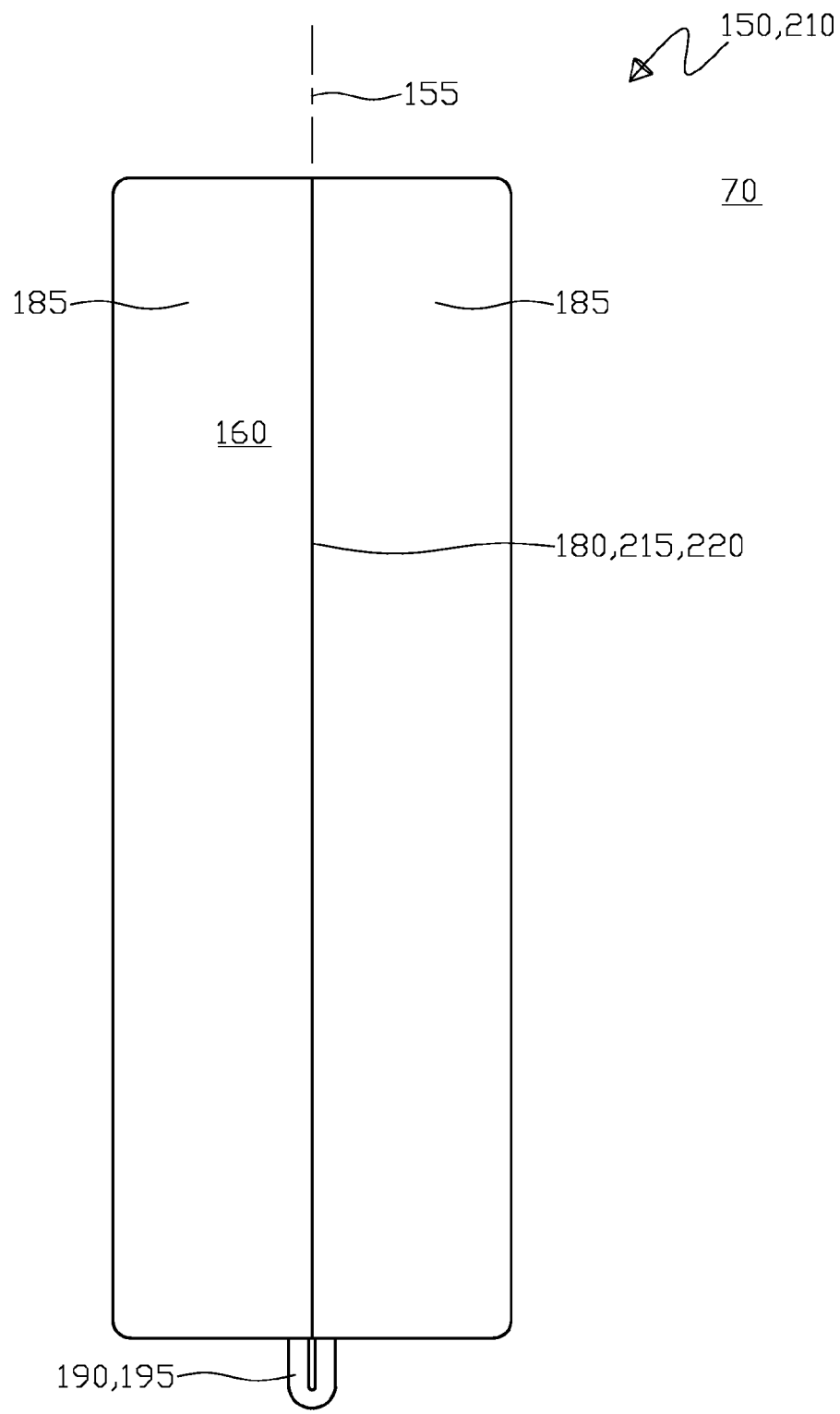
FIG. 8 shows a side elevation view of the clamshell element in the closed state with the surrounding sidewall removed, also shown is the split boundary with the partial clamshell elements adjacent at the split boundary having a removable contact with one another, the hinge, the mating protrusion of the hinge, and the longwise axis.

Further, FIG. 6 shows a perspective view of the cover 370 and in particular a cavity 435 disposed within the cover 370, and the dome shape 410 of the cover 370 and FIG. 7 shows a perspective view of the cover 370 that is opposing to FIG. 6, and in particular the dome shape 410 of the cover 370. Continuing, FIG. 8 shows a side elevation view of the clamshell element 150 in the closed state 210 with the surrounding sidewall 75 removed, also shown is the split boundary 180 with the partial clamshell elements 185 adjacent 215 at the split boundary 180 having a removable contact 220 with one another, the hinge 190, the mating protrusion 195 of the hinge 190, and the longwise axis 155.

Figure 9:
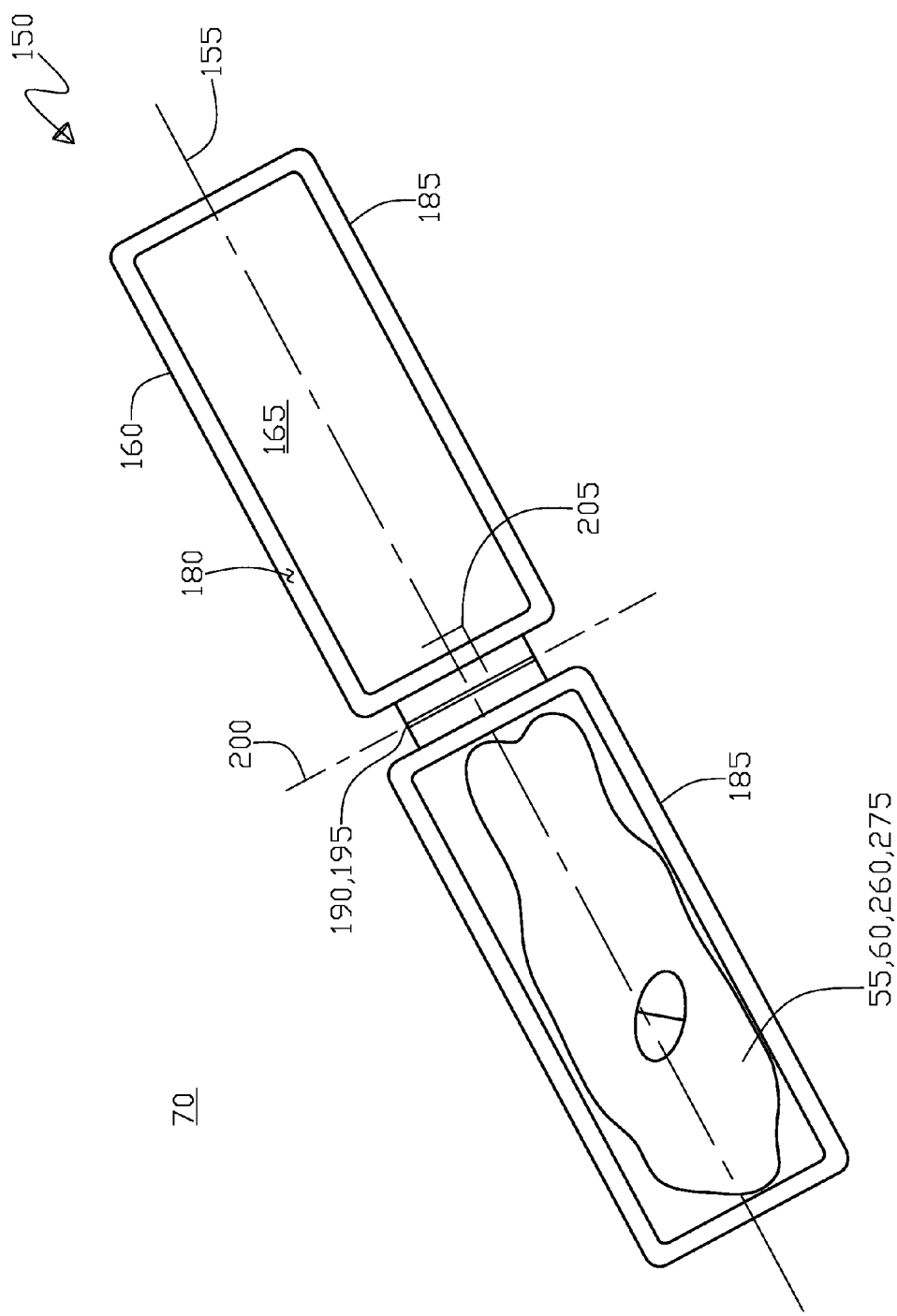
FIG. 9 shows a perspective view of the clamshell element in the open state with the surrounding sidewall removed, also shown is the split boundary with the partial clamshell elements apart from one another at the split boundary the hinge, the mating protrusion of the hinge, the first pivotal axis of the hinge, a perpendicular relationship of the longwise axis and the first pivotal axis, and the longwise axis, wherein the article that is disposed within the inner void being exposed to the external environment.

Next, FIG. 9 shows a perspective view of the clamshell element 150 in the open state 230 with the surrounding sidewall 75 removed, also shown is the split boundary 180 with the partial clamshell elements 185 apart 235 from one another at the split boundary 180, the hinge 190, the mating protrusion 195 of the hinge 190, the first pivotal axis 200 of the hinge 190, a perpendicular relationship 205 of the longwise axis 155 and the first pivotal axis 200, and the longwise axis 155, wherein the article 55 that is disposed within the inner void 165 being exposed to the external environment 70.

Figure 10:
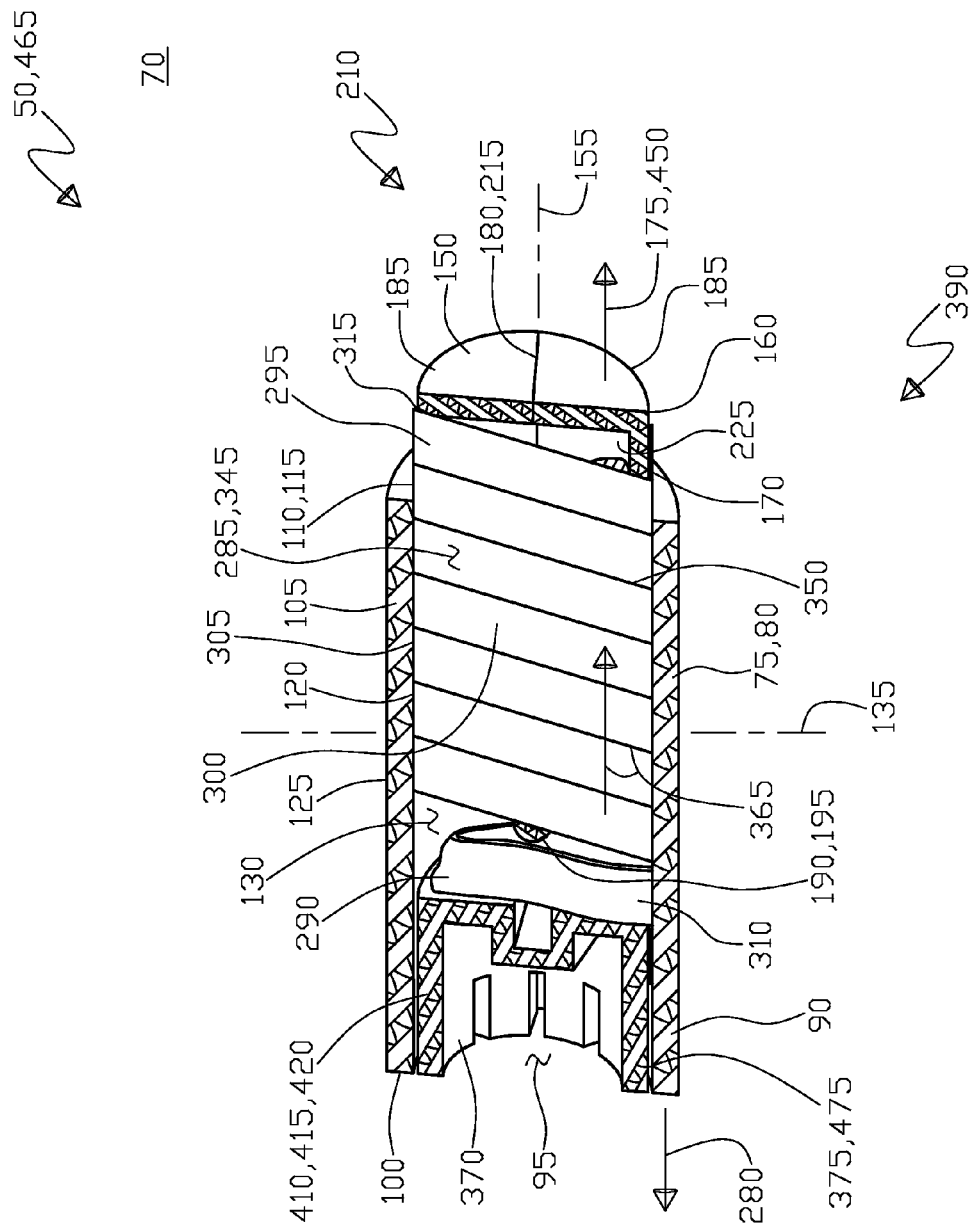
FIG. 10 shows cross sectional view 10-10 from both FIGS. 1 and 2, showing the entire container apparatus as previously described in FIGS. 3 and 5, wherein the clamshell element is just starting to have a movement relative to the inner surface along the longitudinal axis via forcibly removing the inner surface from the outer periphery along the longitudinal axis with the clamshell element exiting therethrough the second aperture thus separating the resting removable engagement of the mating protrusion from the cavity, thus initiating an unwinding of the planar strip progressively away from the hinge.

Moving onward, FIG. 10 shows cross sectional view 10-10 from both FIGS. 1 and 2, showing the entire container apparatus 50 as previously described in FIGS. 3 and 5, wherein the clamshell element 150 is just starting to have a movement 175 relative to the inner surface 120 along the longitudinal axis 85 via forcibly removing 280 the inner surface 120 from the outer periphery 160 along the longitudinal axis 85 with the clamshell element 150 exiting therethrough 390 the second aperture 110 thus separating the resting removable engagement 385 of the mating protrusion 195 from the cavity 435, thus initiating an unwinding 395, 400 of the planar strip 345 progressively away from the hinge 190.

Figure 11:
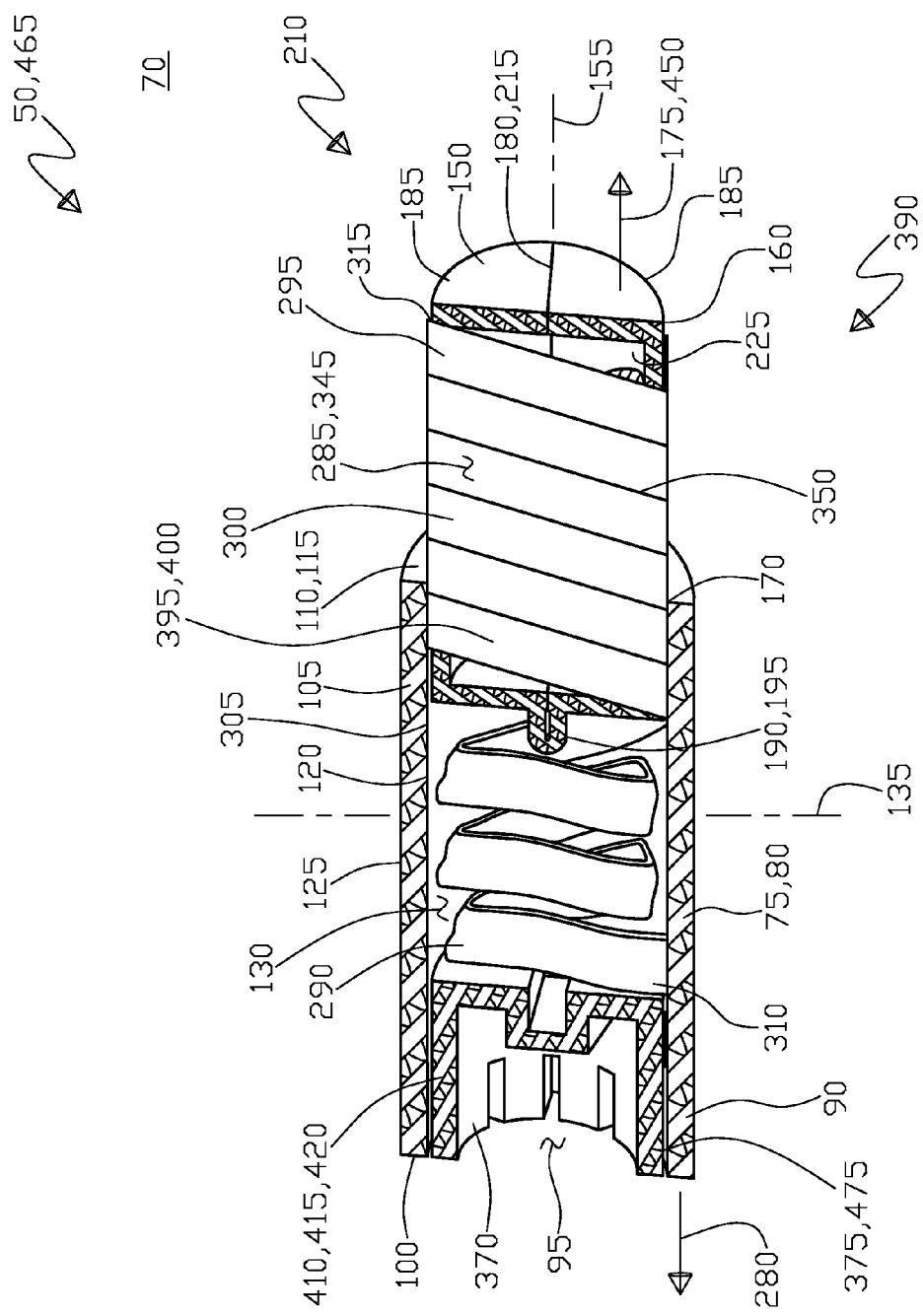
FIG. 11 shows cross sectional view 11-11 from both FIGS. 1 and 2, showing the entire container apparatus as previously described in FIGS. 3 and 5, wherein the clamshell element is further progressing in the movement relative to the inner surface along the longitudinal axis via forcibly further removing the inner surface from the outer periphery along the longitudinal axis with the clamshell element exiting therethrough the second aperture thus separating the resting removable engagement of the mating protrusion from the cavity, thus furthering the unwinding of the planar strip progressively away from the hinge.

Yet further, FIG. 11 shows cross sectional view 11-11 from both FIGS. 1 and 2, showing the entire container apparatus 50 as previously described in FIGS. 3 and 5, wherein the clamshell element 150 is further progressing in the movement 175 relative to the inner surface 120 along the longitudinal axis 85 via forcibly further removing 280 the inner surface 120 from the outer periphery 160 along the longitudinal axis 85. Thus FIG. 11 showing the clamshell element 150 exiting therethrough 390 the second aperture 110 and separating the resting removable engagement 385 of the mating protrusion 195 from the cavity 435, thus furthering the unwinding 395, 400 of the planar strip 345 progressively away from the hinge 190.

Figure 12:
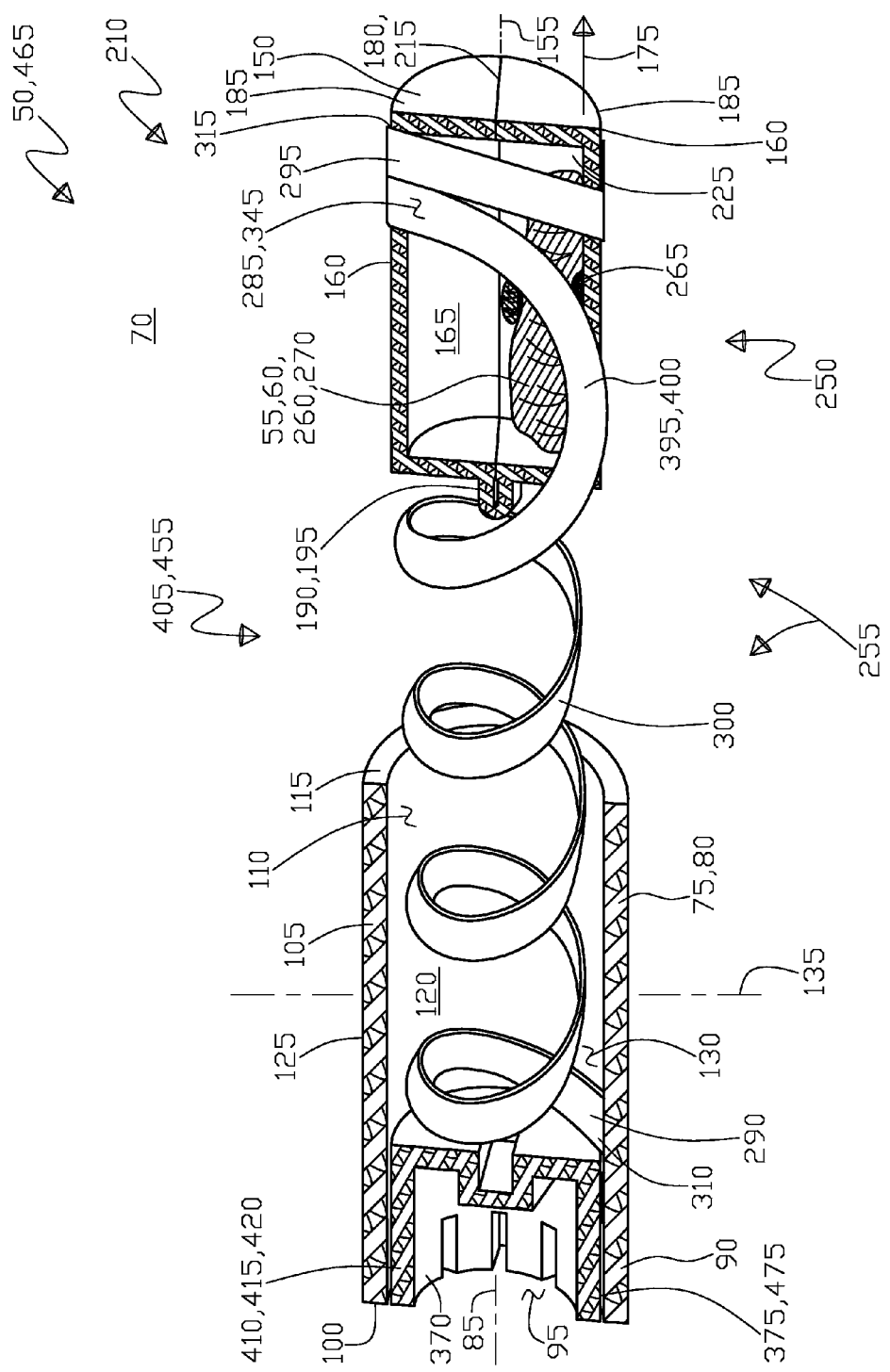
FIG. 12 shows cross sectional view 12-12 from both FIGS. 1 and 2, showing the entire container apparatus as previously described in FIGS. 3 and 5, wherein the clamshell element has separated from the surrounding sidewall thus with the clamshell element completely exiting therethrough the second aperture thus separating the resting removable engagement of the mating protrusion from the cavity, thus even furthering the unwinding of the planar strip progressively away from the hinge, wherein the planar strip is starting to form a tether as between the surrounding sidewall and the clamshell element.

Moving onward, FIG. 12 shows cross sectional view 12-12 from both FIGS. 1 and 2, showing the entire container apparatus 50 as previously described in FIGS. 3 and 5, wherein the clamshell element 150 has separated from the surrounding sidewall 75 thus with the clamshell element 50 completely exiting 390 therethrough the second aperture 110 thus separating the resting removable engagement 385 of the mating protrusion 195 from the cavity 435. With FIG. 12 showing even further unwinding 395 of the planar strip 345 progressively away from the hinge 190, wherein the planar strip 345 is starting to form a tether 320 as between the surrounding sidewall 75 and the clamshell element 150.

Figure 13:
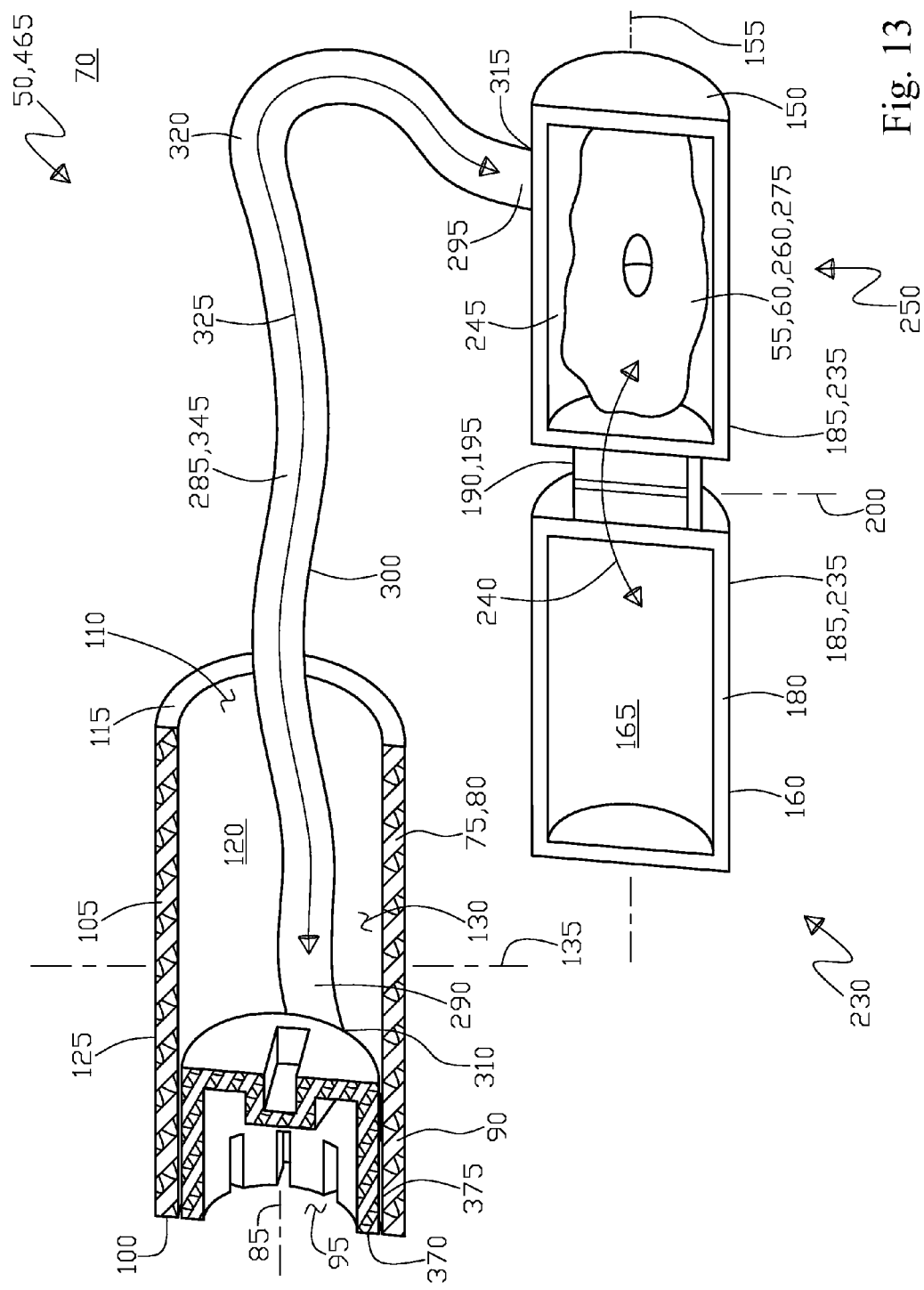
FIG. 13 shows cross sectional view of the surrounding sidewall is cross section and the clamshell element is the open state both being airborne, thus showing the entire container apparatus as previously described in FIGS. 3 and 5, wherein the clamshell element has separated from the surrounding sidewall thus with the clamshell element completely exiting therethrough the second aperture thus separating the resting removable engagement of the mating protrusion from the cavity, thus completing the unwinding of the planar strip progressively away from the hinge, wherein the planar strip has formed the tether as between the surrounding sidewall and the clamshell element, wherein due to the planar strip completely unwinding from the outer periphery facilitates the clamshell element going from the closed state to the open state as previously shown and described in FIG. 9.

Continuing, FIG. 13 shows cross sectional view of the surrounding sidewall 75 in cross section and the clamshell element 150 is in the open state 230 both being airborne, thus showing the entire container apparatus 50 as previously described in FIGS. 3 and 5, wherein the clamshell element 150 has separated from the surrounding sidewall 75 thus with the clamshell element 150 completely exiting 390 therethrough the second aperture 110 thus separating the resting removable engagement 385 of the mating protrusion 195 from the cavity 435, thus completing the unwinding 395 of the planar strip 345 progressively away from the hinge 190. Also, FIG. 13 shows the planar strip 345 has formed the tether 320 as between the surrounding sidewall 75 and the clamshell element 150, wherein due to the planar strip 345 completely unwinding 395 from the outer periphery 160 facilitates the clamshell element 150 going from the closed state 210 to the open state 230 as previously shown and described in FIG. 9.

Figure 14:
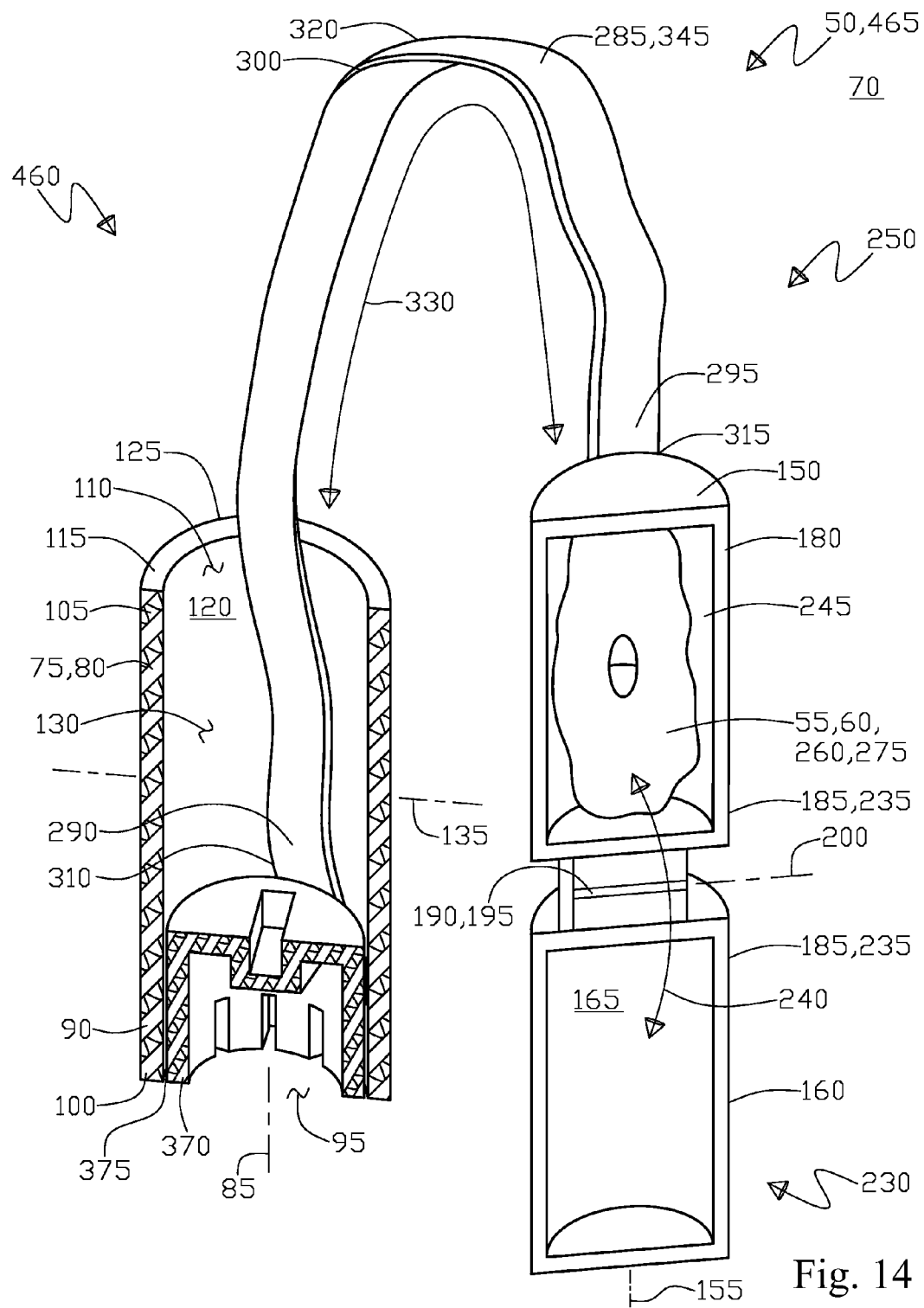
FIG. 14 shows cross sectional view of the surrounding sidewall is cross section and the clamshell element is the open state both being airborne, thus showing the entire container apparatus as previously described in FIGS. 3 and 5, wherein the clamshell element has separated from the surrounding sidewall thus with the clamshell element completely exiting therethrough the second aperture thus separating the resting removable engagement of the mating protrusion from the cavity, thus completing the unwinding of the planar strip progressively away from the hinge, wherein the planar strip has formed the tether as between the surrounding sidewall and the clamshell element, wherein due to the planar strip completely unwinding from the outer periphery facilitates the clamshell element going from the closed state to the open state as previously shown and described in FIG. 9, with the tether shown to become more taut thus increasing the tether distance and a silhouette of the surrounding sidewall, tether, and open state clamshell element.

Next, FIG. 14 shows cross sectional view of the surrounding sidewall 75 in cross section and the clamshell element 150 is the open state 230 both being airborne, thus showing the entire container apparatus 50 as previously described in FIGS. 3 and 5, wherein the clamshell element 150 has separated from the surrounding sidewall 75 thus with the clamshell element 150 completely exiting 390 therethrough the second aperture 110 thus separating the resting removable engagement 385 of the mating protrusion 195 from the cavity 435, thus completing the unwinding 395 of the planar strip 345 progressively away from the hinge 190. Further FIG. 14 shows the planar strip 345 has formed the tether 320 as between the surrounding sidewall 75 and the clamshell element 150, wherein due to the planar strip 345 completely unwinding 395 from the outer periphery 160 facilitates the clamshell element 150 going from the closed state 210 to the open state 230 as previously shown and described in FIG. 9, with the tether 320 shown to become more taut thus increasing the tether 320 distance 330 and a larger silhouette 335 of the surrounding sidewall 75, tether 320, and open state 230 clamshell element 150.

Figure 15:
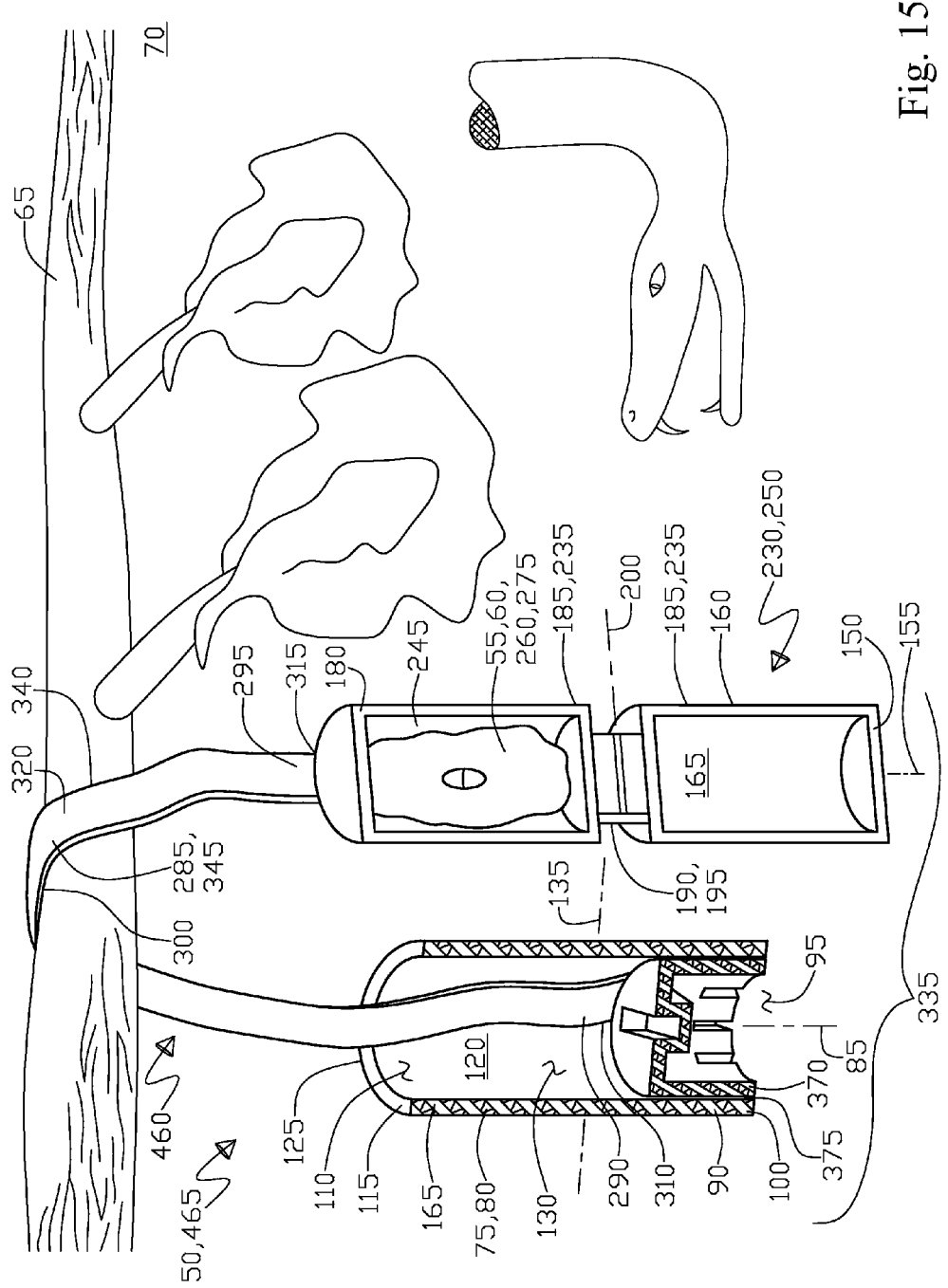
FIG. 15 shows cross sectional view of the surrounding sidewall in cross section and the clamshell element is the open state both going from being airborne to becoming entangled within the thicket growth or forest canopy via the distance and silhouette of the surrounding sidewall, tether, and open state clamshell element, thus showing the entire container apparatus as previously described in FIGS. 3 and 5, thus the container apparatus is fully deployed within the forest canopy with exposed bait.

Further, FIG. 15 shows cross sectional view of the surrounding sidewall 75 in cross section and the clamshell element 150 is the open state 230 both going from being airborne to becoming entangled 340 within the thicket growth 65 or forest canopy via the distance 330 and silhouette 335 of the surrounding sidewall 75, tether 320, and open state 230 clamshell element 150, thus showing the entire container apparatus 50 as previously described in FIGS. 3 and 5, thus the container apparatus 50 is fully deployed within the forest canopy 65 with exposed bait 55.

Figure 16:
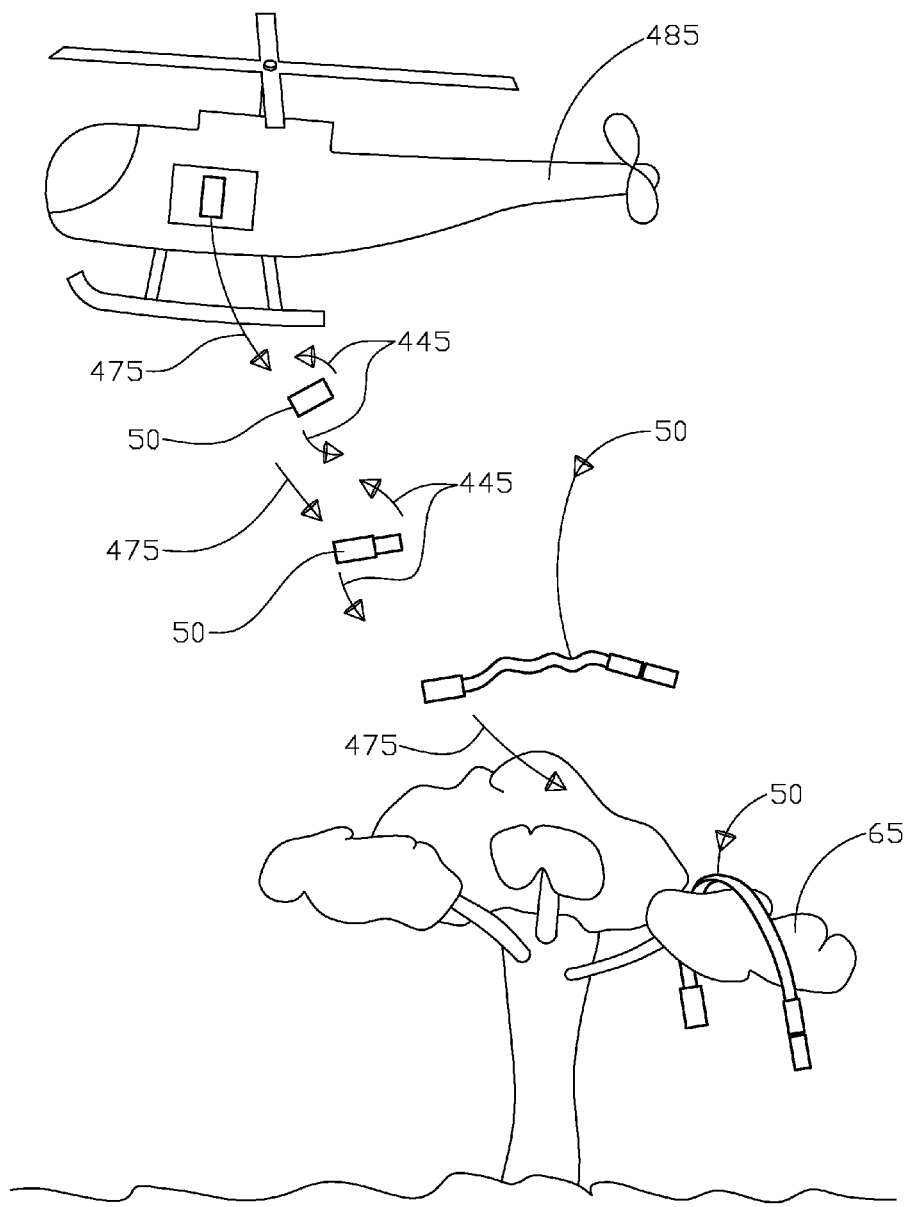
FIG. 16 shows a side elevation view of a method of deploying the container apparatus via aircraft or in particular a helicopter wherein the deployment of the container apparatus imparts an initial rotation of the container apparatus about the rotational axis as the container apparatus is ejected from the aircraft thus causing a centrifugal force through the offset that forcibly removes the surrounding sidewall from the clamshell element along the longitudinal axis thereby causing the planar strip to unwind and form the tether that creates the silhouette of the surrounding sidewall, tether, and open state clamshell element that is ready to become entangled in the forest canopy.

Continuing, FIG. 16 shows a side elevation view of a method of deploying 470, 475 the container apparatus 50 via aircraft 485 or in particular a helicopter 485 wherein the deployment 470 of the container apparatus 50 imparts an initial rotation 445 of the container apparatus 50 about the rotational axis 135 as the container apparatus 50 is ejected from the aircraft 485 thus causing a centrifugal force 450 through the offset 440 via the initial rotation 445 that forcibly removes 280 the surrounding sidewall 75 from the clamshell element 150 along the longitudinal axis 85 thereby causing the planar strip 345 to unwind 395 and form the tether 320 that creates the silhouette 335 of the surrounding sidewall 75, tether 320, and open state 230 clamshell element 150 that is ready to become entangled 340 in the forest canopy 65.

Figure 17:
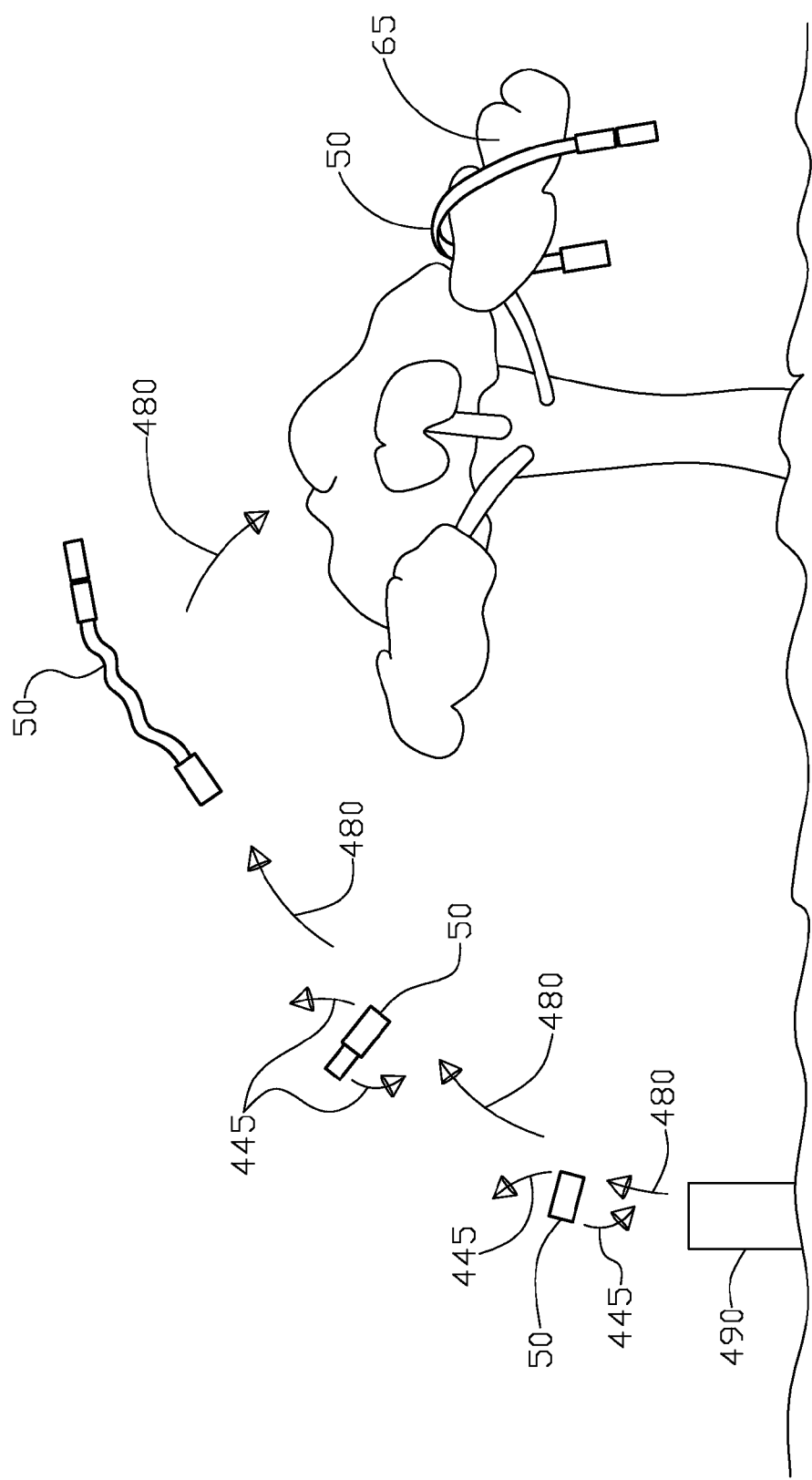
FIG. 17 shows a side elevation view of a method of deploying the container apparatus via a ground surface position ejection wherein the deployment of the container apparatus imparts an initial rotation of the container apparatus about the rotational axis as the container apparatus is ejected from the ground surface position thus causing a centrifugal force through the offset that forcibly removes the surrounding sidewall from the clamshell element along the longitudinal axis thereby causing the planar strip to unwind and form the tether that creates the silhouette of the surrounding sidewall, tether, and open state clamshell element that is ready to become entangled in the forest canopy.

Further, FIG. 17 shows a side elevation view of a method of deploying 470, 480, the container apparatus 50 via a ground surface position 490 ejection wherein the deployment 480 of the container apparatus 50 imparts an initial rotation 445 of the container apparatus 50 about the rotational axis 135 as the container apparatus 50 is ejected from the ground surface position 490 thus causing a centrifugal force 450 through the offset 440 via the initial rotation 445 that forcibly removes 280 the surrounding sidewall 75 from the clamshell element 150 along the longitudinal axis 85 thereby causing the planar strip 345 to unwind 395 and form the tether 320 that creates the silhouette 335 of the surrounding sidewall 75, tether 320, and open state 230 clamshell element 150 that is ready to become entangled 340 in the forest canopy 65.

Broadly, the present invention is of the container apparatus 50 for exposing an article 55 to an external environment 70, the container apparatus 50 including the surrounding sidewall 75 that is about the longitudinal axis 85, the surrounding sidewall 75 including a first end portion 90 and an opposing second end portion 105 along the longitudinal axis 85, see FIGS. 1, 2, and 3. The surrounding sidewall 75 having an inner surface 120 and an opposing outer surface 125, with the first end portion 90 terminating in a first aperture 95 defining a first margin portion 100, and the second end portion 105 terminating in a second aperture 110 defining a second margin portion 115, see FIG. 3 in particular. Wherein the surrounding sidewall 75 inner surface 120, the first aperture 95, and the second aperture 110 defining a sidewall interior 130 of the surrounding sidewall 75, as differentiated from the external environment 70 outside of the sidewall interior 130, again see FIG. 3 in particular. The surrounding sidewall 75 also having the rotational axis 135 that is perpendicular 145 to the longitudinal axis 85, with the rotational axis 135 also being positioned 140 between the first 90 and second 105 end portions, as best shown in FIGS. 1, 2, and 3.

Further included in the container apparatus 50 is the clamshell element 150 having the outer periphery 160 and the inner void 165 disposed within the periphery 160, wherein the outer periphery 160 is slidably engaged 170 to the surrounding sidewall 75 inner surface 120 such that the clamshell element 150 has movement 175 along the longitudinal axis 85 within the sidewall interior 130, see FIGS. 3, 4 and 8 to 11. The clamshell element 150 having a split boundary 180 separating the clamshell element 150 into a plurality of partial clamshell elements 185, wherein a portion of the split boundary 180 is a hinge 190 as between the plurality of partial clamshell elements 185, see FIGS. 3, 4, 8, and 9.

The clamshell element 150 having a closed state 210 defined as the plurality of partial clamshell elements 185 being adjacent 215 to one another at the split boundary 180 with the inner void 165 being a closed volume 225 separated from the external environment 70, see FIGS. 1, 2, 3, 4, 5, 8, 10, 11, and 12. The clamshell element 150 having an open state 230 defined as the plurality of partial clamshell elements 185 being partially separated apart 235 from one another at the split boundary 180 being affixed to one another via the hinge 190 such that the partial clamshell elements 185 pivot apart 240 resulting with the inner void 165 being an open volume 245 exposed to the external environment 70, see FIGS. 9, 13, 14, and 15. Wherein, when the clamshell element 150 has the slidable engagement 170 on the outer periphery 160 to the surrounding sidewall 75 inner surface 120 the clamshell element 150 is in the closed state 210, see FIGS. 1, 2, 3, 10, and 11.

Further, when the clamshell element 150 is not 250 slidably engaged 170 on the outer periphery 160 and clear 255 from the surrounding sidewall 75 inner surface 120, the clamshell element 150 is in the external environment 70, having a separation 405 of the surrounding sidewall 75 and the clamshell element 150, see FIGS. 8, 9, and 12 to 15. When the clamshell element 150 is in the external environment 70 it can be in the closed 210 or open 230 state. Wherein operationally, the article 55 is disposed 260 within and affixed 265 to the inner void 165 with the article 55 isolated 270 from the external environment 70 when the clamshell element 150 is in the closed state 210 and the article 55 being exposed 275 to the external environment 70 when the clamshell element 150 is in the open state 230 being facilitated by the surrounding sidewall 75 inner surface 120 having been forcibly removed 280 in a direction along the longitudinal axis 85 from the clamshell element 150 outer periphery 160, see FIGS. 3 and 10 to 15.

As an option for the container apparatus 50, it can further include the elongated flexible member 285 having the primary end portion 290 and the opposing secondary end portion 295 with a mid-portion 300 positioned therebetween, see FIGS. 3, 5, and 10 to 15. The elongated flexible member 285 is disposed 305 between the surrounding sidewall 75 inner surface 120 and the clamshell element 150 outer periphery 160 with the primary end portion 290 affixed 310 to the surrounding sidewall 75 and the secondary end portion 295 is affixed 315 to the clamshell element 150 all while the clamshell element 150 is in the closed state 210, see FIG. 3 in particular, and FIGS. 5, and 10 to 13. Wherein operationally, when the clamshell element 150 is not slidably engaged 170 on the outer periphery 160 and is clear 255 from the surrounding sidewall 75 inner surface 120, the elongated flexible member 285 acts as the flexible tether 320 as between the surrounding sidewall 75 and the clamshell element 150 to create a distance 330 between the surrounding sidewall 75 and the clamshell element 150 to enable a larger silhouette 335 being of a combination of the surrounding sidewall 75, the elongated flexible member 285, and the clamshell element 150 to enhance a potential for entanglement 340 of the container apparatus 50 in a thicket growth 65, see FIGS. 12 to 15.

As a further optional refinement, the elongated flexible member 285 is preferably constructed of the planar strip 345 of material that is wound 350 about the clamshell 150 outer periphery 160 in the spiral form 355 when the clamshell element 150 is in the closed state 210, to operationally facilitate a longer length 325 of the elongated flexible member 285 thus increasing the distance 330 of the tether 320 to further enhance a potential for entanglement 340 in a thicket growth 65 combination of the surrounding sidewall 75, the elongated flexible member 285, and the clamshell element 150, as best seen in FIGS. 3, 5, and 10 to 15.

As another optional refinement, the elongated flexible member 285 is preferably the helical 360 spiral form 355 of the planar strip 345 of material that includes the helical 360 spiral 355 being wound 365 onto the outer periphery 160 in a direction progressing along the longitudinal axis 85 from the first margin portion 100 toward the second margin portion 115 when the clamshell element 150 is in the closed state 210, see FIGS. 5 and 10 to 12. Wherein operationally, this is to further ensure the planar strip 345 of material unwinds 455 the helical 360 spiral 355 in a more tangle free manner when the clamshell element 150 outer periphery 160 is clear 255 from the cylinder 80 inner surface 120.

Another option for the container apparatus 50 is to further comprise the cover 370 that is affixed 375 to the first margin portion 100, wherein the clamshell element 150 rests 380 against and is in removable contact 385 with the cover 370 resulting in the surrounding sidewall 75 second aperture 110 remaining open while the clamshell element 150 is in the closed state 210, as best shown in FIGS. 3 and 10 to 12. Operationally, this is to cause the clamshell element 150 to exit 390 the surrounding sidewall 75 therethrough the second aperture 110 from the surrounding sidewall 75 inner surface 120 having been forcibly removed 280 in a direction along the longitudinal axis 85 from the clamshell element 150 outer periphery 160 with the purpose being to further ensure that the spiral form 355 of the planar strip 345 of material unwinds 455 the spiral 355 in a more tangle free manner.

As a further option for the cover 370, it is preferably constructed and formed into a dome shape 410 that projects inwardly 415 toward the sidewall 75 interior 130 wherein the cover 370 is disposed 420 within a portion of the sidewall 75 interior 130, wherein the cover 370 is affixed 425 to a portion of the surrounding sidewall 75 inner surface 120, further the planar strip 345 primary end portion 290 is affixed 430 to the cover 370, as best shown in FIGS. 3 and 10 to 12. Thus the cover 370 axially positions 440 the clamshell element 150 in the closed state 210 along the longitudinal axis 85 to be within a portion of the surrounding sidewall 75 interior 130 causing an offset 440 of the closed state 210 clamshell element 150 axial position along the longitudinal axis 85 while the clamshell element 150 is disposed within the surrounding sidewall 75 interior 130, see in particular FIG. 3.

Wherein operationally, the clamshell element 150 outer periphery 160 is clear 255 from the surrounding sidewall 75 inner surface 120 having been forcibly removed 280 in a direction along the longitudinal axis 85 from the clamshell element 150 outer periphery 160 exiting 390 therethrough the surrounding sidewall 75 second aperture 110 via the surrounding sidewall 75 being rotated 445 about the rotational axis 135. Wherein the offset 440 through centrifugal force 450 causes the clamshell element 150 to dislodge 280 or clear 255 from the surrounding sidewall 75 un-spiraling 455 of the planar strip 345 of material into the tether 320. Wherein the surrounding sidewall 75 and the clamshell element 150 separate 390 from one another to help keep the tether 320 substantially taut 460 thus helping to maximize the distance 330 as between the surrounding sidewall 75 and the clamshell element 150 to further enhance the potential for entanglement 340 in a thicket growth 65 of the combination of the surrounding sidewall 75, the tethered 320 planar strip 345, and the clamshell element 150, see FIGS. 10 to 15.

Another option for the container apparatus 50 regarding the hinge 190 that is positioned in removable contact 220 with the cover 370 when the clamshell element 150 is in the closed state 210. Wherein operationally, when the clamshell element 150 exits 255 the cylinder 80 therethrough the second aperture 110 the planar strip 345 of material will unwind 455 from the outer periphery 160 progressively 400 away from the hinge 190 to keep the clamshell element 150 in the closed state 210 for an extended period of time outside of the cylinder 80, see FIGS. 10 to 15. This is due to the remaining helical 360 spiral 355 form of the planar strip 345 of material wound onto the outer periphery 160 keeping the clamshell element 150 in the closed state 210 thus delaying the clamshell element 150 from being able to go into the open state 230 until the tether 320 is unwound 455 into the taut 460 position with the result that the tether 320 is taut 460 prior to the clamshell element 150 being able to go into the open state 230 to help maximize a span 330 of the silhouette 335 to further enhance a potential for entanglement 340 of the container apparatus 50 in a thicket growth 65.

Note that going from the closed state 210 to the open state 230 could also be delayed beyond the tether 320 being unwound 455 into the taut 460 position due to selectable time dependent biodegradable material at the split boundary 180 facilitating the clamshell element 150 going from the closed state 210 to the open state 230 at some point in time past the unwinding 455 of the planar strip 345 from the outer periphery 160, wherein the clamshell element 150 of FIG. 8 would be substituted into FIGS. 13 to 15.

Another option for the container apparatus 50 regarding the cover 370 dome shape 410 further includes the cavity 435 that receives a removable engagable 385 mating protrusion 195 on the hinge 190 to rotationally lock the cover 370 and the clamshell element 150 that is in the closed state 210 to one another about the longitudinal axis 85 for the purpose of preserving the helical 360 spiral 355 form of the planar strip 345 of material wound winding 350 onto the outer periphery 160 to keep the clamshell element 150 in the closed state 210, as shown in FIGS. 3, 6, 8, and 10 to 12.

METHOD OF USE

In looking at FIGS. 2 and 10 to 17, a method 465 of displacing the poisoned bait 60 in a selected thicket growth 65 in the external environment 70 is disclosed using the container apparatus 50 that has a first step of providing the container apparatus 50 as previously described and shown in FIGS. 1 to 13. A next step of deploying 470 the container apparatus 50 such that the cylinder 80 initially rotates 445 about the rotational axis 135 adjacent to the selected thicket growth 65, as best shown in FIGS. 2 and 10 to 17.

Alternatively, for the method of displacing the poisoned bait 60 in a selected thicket growth 65 in the external environment 70 the deploying 470 step can further include releasing 475 the container apparatus 50 from an aircraft 485 flying over the selected thicket growth 65, as shown in FIG. 16. Further, alternatively, for the method of displacing the poisoned bait 60 in a selected thicket growth 65 in the external environment 70 the deploying 470 step can further include releasing 480 the container apparatus 50 from the ground position 490 adjacent to the selected thicket growth 65.

CONCLUSION

Accordingly, the present invention of the container apparatus has been described with some degree of particularity directed to the embodiments of the present invention. It should be appreciated, though; that the present invention is defined by the following claim construed in light of the prior art so modifications or changes may be made to the exemplary embodiments of the present invention without departing from the inventive concepts contained therein.

The invention claimed is:

1. A container apparatus for exposing an article to an external environment, comprising:
    (a) a surrounding sidewall that is about a longitudinal axis, said surrounding sidewall including a first end portion and an opposing second end portion along said longitudinal axis, said surrounding sidewall having an inner surface and an opposing outer surface, said first end portion terminating in a first open aperture defining a first margin portion and said second end portion terminating in a second open aperture defining a second margin portion, said surrounding sidewall inner surface, said first aperture, and said second aperture defining a sidewall interior of said surrounding sidewall, as differentiated from the external environment outside of said sidewall interior; and
    (b) a capsule element having an outer periphery and an inner void disposed within said periphery, wherein said outer periphery is slidably engaged to said surrounding sidewall inner surface such that said capsule element has movement along said longitudinal axis within said sidewall interior, said capsule element having a split boundary separating said capsule element into a plurality of partial capsule elements, said capsule element having a closed state defined as said plurality of partial capsule elements are adjacent to one another at said split boundary with said inner void being a closed volume separated from the external environment and said capsule element having an open state defined as said plurality of partial capsule elements are partially separated apart from one another at said split boundary with said inner void being an open volume exposed to the external environment, wherein when said capsule element has said slidable engagement on said outer periphery to said surrounding sidewall inner surface said capsule element is in said closed state, wherein said capsule element is disposed completely within said surrounding sidewall interior between said first and second end portions when said capsule element is in said closed state, and when said capsule element is not slidably engaged on said outer periphery and clear from said surrounding sidewall inner surface, wherein said capsule element is in the external environment, said capsule element can be in said open state, wherein operationally the article is disposed within said inner void with the article isolated from the external environment when said capsule element is in said closed state and the article being exposed to the external environment when said capsule element is in said open state facilitated by said surrounding sidewall inner surface having been forcibly removed in a direction along said longitudinal axis from said capsule element outer periphery.

2. A container apparatus for exposing the article to the external environment according to claim 1 further comprising an elongated flexible member having a primary end portion and an opposing secondary end portion with a mid-portion positioned therebetween, said elongated flexible member is disposed between said surrounding sidewall inner surface and said capsule element outer periphery with said primary end portion affixed to said surrounding sidewall and said secondary end portion affixed to said capsule element all while said capsule element is in said closed state, wherein operationally when said capsule element is not slidably engaged on said outer periphery and is clear from said surrounding sidewall inner surface, said elongated flexible member acts as a flexible tether as between said surrounding sidewall and said capsule element to create a distance between said surrounding sidewall and said capsule element to enable a larger silhouette being of a combination of said surrounding sidewall, said elongated flexible member, and said capsule element to enhance a potential for entanglement of said container apparatus in a thicket growth.

3. A container apparatus for exposing the article to the external environment according to claim 2 wherein said elongated flexible member is constructed of a planar strip of material that is wound about said capsule outer periphery in a spiral form when said capsule element is in said closed state, to operationally facilitate a longer length of said elongated flexible member thus increasing said distance of said tether to further enhance a potential for entanglement in a thicket growth combination of said surrounding sidewall, said elongated flexible member, and said capsule element.

4. A container apparatus for exposing the article to the external environment according to claim 3 further comprising a cover that is affixed to said first margin portion, wherein said capsule element rests against and is in removable contact with said cover resulting in said surrounding sidewall second aperture remaining open while said capsule element is in said closed state, operationally this is to cause said capsule element to exit said surrounding sidewall therethrough said second aperture from said surrounding sidewall inner surface having been forcibly removed in a direction along said longitudinal axis from said capsule element outer periphery with the purpose being to further ensure that said spiral form of said planar strip of material unwinds said spiral in a more tangle free manner.

5. A container apparatus for exposing the article to the external environment according to claim 4 wherein said cover is formed into a dome shape that projects inwardly toward said sidewall interior wherein said cover is disposed within a portion of said sidewall interior, wherein said cover is affixed to a portion of said surrounding sidewall inner surface, further said planar strip primary end portion is affixed to said cover, thus said cover axially positions said capsule element in said closed state along said longitudinal axis to be within a portion of said surrounding sidewall interior causing an offset of said closed state capsule element axial position along said longitudinal axis while said capsule element is disposed within said surrounding sidewall interior, wherein operationally said capsule element outer periphery is clear from said surrounding sidewall inner surface having been forcibly removed in a direction along said longitudinal axis from said capsule element outer periphery therethrough said surrounding sidewall second aperture via said surrounding sidewall being rotated about a rotational axis that is perpendicular to said longitudinal axis, said rotational axis is also positioned between said first and second end portions, wherein said offset through centrifugal force causes said capsule element to dislodge from said surrounding sidewall un-spiraling said planar strip of material into said tether, wherein said surrounding sidewall and said capsule element separate from one another to help keep said tether substantially taut thus helping to maximize said distance as between said surrounding sidewall and said capsule element to further enhance said potential for entanglement in a thicket growth of said combination of said surrounding sidewall, said tethered planar strip, and said capsule element.

6. A container apparatus for exposing a poisoned bait to an external environment, comprising:

(a) a cylinder that is about a longitudinal axis, said cylinder including a first end portion and an opposing second end portion along said longitudinal axis, said cylinder having an inner surface and an opposing outer surface, said first end portion terminating in a first aperture defining a first margin portion and said second end portion terminating in a second aperture defining a second margin portion, said cylinder inner surface, said first aperture, and said second aperture defining a cylinder interior of said cylinder, as differentiated from the external environment outside of said cylinder interior, said cylinder also having a rotational axis that is perpendicular to said longitudinal axis, said rotational axis is also positioned at essentially a mid-point between said first and second end portions;

(b) a clamshell element having a longwise axis, said clamshell element having an outer periphery and an inner void disposed within said periphery, wherein said outer periphery is slidably engaged to said cylinder inner surface such that said clamshell element has movement along said longitudinal axis within said cylinder interior, said clamshell element having a split boundary along said longwise axis that separates said clamshell element into a pair of clam shell halves, wherein a portion of said split boundary has a hinge as between said pair of clam shell halves, said hinge has a first pivotal axis that is perpendicular to said longwise axis, said clamshell element having a closed state defined as said pair of clam shell halves being in removable contact to one another at said split boundary with said inner void being a closed volume separated from the external environment and said clamshell element having an open state defined as said pair of clam shell halves are pivoted apart from one another about said first pivotal axis being affixed to one another via said hinge with said inner void becoming an open volume exposed to the external environment, wherein when said clamshell element is slidably engaged on said outer periphery to said cylinder inner surface said clamshell element is in said closed state, and when said clamshell element is not slidably engaged on said outer periphery to said surrounding cylinder inner surface said clamshell element can be in said open state, wherein operationally the poisoned bait is disposed within and affixed to a portion of said inner void with the poisoned bait isolated from the external environment when said clamshell element is in said closed state and the poisoned bait being exposed to the external environment when said clamshell element is in said open state facilitated by said cylinder inner surface having been forcibly removed in a direction along said longitudinal axis from said clamshell element outer periphery; and (c) an elongated flexible member having a primary end portion and an opposing secondary end portion with a mid-portion positioned therebetween, said elongated flexible element is disposed between said cylinder inner surface and said clamshell element outer periphery with said primary end portion affixed to said cylinder and said secondary end portion affixed to said clamshell element all while said clamshell element is in said closed state, wherein operationally when said clamshell element is not slidably engaged on said outer periphery and is clear from said cylinder inner surface said elongated flexible member acts as a flexible tether as between said cylinder and said clamshell element to create a distance between said cylinder and said clamshell element to enable a larger silhouette being of a combination of said cylinder, said elongated flexible member, and said clamshell element to enhance a potential for entanglement of said container apparatus in a thicket growth.

7. A container apparatus for exposing the poisoned bait to the external environment according to claim 6 wherein said elongated flexible member is constructed of a planar strip of material that is wound about said clamshell outer periphery in a helical spiral form when said clamshell element is in said closed state, to operationally facilitate a longer length of said elongated flexible member thus increasing a length of said tether to further enhance a potential for entanglement in a thicket growth of a combination of said cylinder, said planar strip of material, and said clamshell element.

8. A container apparatus for exposing the poisoned bait to the external environment according to claim 7 further comprising a cover that is affixed to said first margin portion, wherein said clamshell element rests against and is in removable contact with said cover resulting in said cylinder second aperture remaining open while said clamshell element is in said closed state, operationally this is to cause said clamshell element to exit said cylinder therethrough said second aperture from said cylinder inner surface having been forcibly removed in a direction along said longitudinal axis from said clamshell element outer periphery with the purpose being to further ensure that said helical spiral form or said planar strip of material unwinds said helical spiral in a more tangle free manner.

9. A container apparatus for exposing the poisoned bait to the external environment according to claim 8 wherein said cover is formed into a dome shape that projects inwardly toward said cylinder interior wherein said cover is disposed within a portion of said cylinder interior, wherein said cover is affixed to a portion of said cylinder inner surface, further said planar strip primary end portion is affixed to said cover, thus said cover axially positions said clamshell element in said closed state along said longitudinal axis, said clamshell element is completely enveloped within a portion of said cylinder interior causing a non-symmetric offset of said closed state clamshell element axial position along said longitudinal axis and about said rotational axis while said clamshell element is completely disposed within said portion of said cylinder interior, wherein operationally said clamshell element outer periphery is clear from cylinder inner surface having been forcibly removed in a direction along said longitudinal axis from said clamshell element outer periphery therethrough said cylinder second aperture via said cylinder being rotated about said rotational axis wherein said non-symmetric offset through centrifugal force causes said clamshell element to dislodge from said cylinder un-spiraling said planar strip of material into said tether wherein a combination of said cylinder and said clamshell element separate from one another to help keep said tether into a substantially taut position thus helping to maximize a distance as between said cylinder and said clamshell element to further enhance said potential for entanglement in a thicket growth of a combination of said cylinder, said tethered planar strip, and said clamshell element.

10. A container apparatus for exposing the poisoned bait to the external environment according to claim 9 wherein said helical spiral form of said planar strip of material includes said helical spiral being wound onto said outer periphery in a direction progressing along said longitudinal axis from said first margin portion toward said second margin portion when said clamshell element is in said closed state, wherein operationally this is to further ensure said planar strip of material unwinds said helical spiral in a more tangle free manner when said clamshell element outer periphery is clear from said cylinder inner surface.

11. A container apparatus for exposing the poisoned bait to the external environment according to claim 10 wherein said hinge is positioned in removable contact with said cover when said clamshell element is in said closed state, wherein operationally when said clamshell element exits said cylinder therethrough said second aperture said planar strip of material will unwind from said outer periphery progressively away from said hinge to keep said clamshell element in said closed state for an extended period of time outside of said cylinder due to said remaining helical spiral form of said planar strip of material wound onto said outer periphery keeping said clamshell element in said closed state thus delaying said clamshell element being able to go into said open state until said tether is unwound into said taut position with the result that said tether is taut prior to said clamshell element being able to go into said open state to help maximize a span of said silhouette to further enhance a potential for entanglement of said container apparatus in a thicket growth.

12. A container apparatus for exposing the poisoned bait to the external environment according to claim 11 wherein said cover dome shape further includes a cavity that receives a removable engagable mating protrusion on said hinge to rotationally lock said cover and said clamshell element that is in said closed state to one another about said longitudinal axis for the purpose of preserving said helical spiral form of said planar strip of material wound winding onto said outer periphery to keep said clamshell element in said closed state.

13. A method of displacing a poisoned bait in a selected thicket growth in an external environment, comprising the steps of:
(a) providing a container apparatus that includes a cylinder that is about a longitudinal axis, said cylinder including a first end portion and an opposing second end portion along said longitudinal axis, said cylinder having an inner surface and an opposing outer surface, said first end portion terminating in a first aperture defining a first margin portion and said second end portion terminating in a second aperture defining a second margin portion, said cylinder inner surface, said first aperture, and said second aperture defining a cylinder interior of said cylinder, as differentiated from the external environment outside of said cylinder interior, said cylinder also having a rotational axis that is perpendicular to said longitudinal axis, said rotational axis is also positioned at essentially a mid-point between said first and second end portions, a clamshell element having a longwise axis, said clamshell element having an outer periphery and an inner void disposed within said periphery, wherein said outer periphery is slidably engaged to said cylinder inner surface such that said clamshell element has movement along said longitudinal axis within said cylinder interior, said clamshell element having a split boundary along said longwise axis that separates said clamshell element into a pair of clam shell halves, wherein a portion of said split boundary has a hinge as between said pair of clam shell halves, said hinge has a first pivotal axis that is perpendicular to said long axis, said clamshell element having a closed state defined as said pair of clam shell halves being in removable contact to one another at said split boundary with said inner void being a closed volume separated from the external environment and said clamshell element having an open state defined as said pair of clam shell halves are pivoted apart from one another about said first pivotal axis being affixed to one another via said hinge with said inner void becoming an open volume exposed to the external environment, wherein when said clamshell element is slidably engaged on said outer periphery to said cylinder inner surface said clamshell element is in said closed state, and when said clamshell element is not slidably engaged on said outer periphery to said surrounding cylinder inner surface said clamshell element can be in said open state, wherein operationally the poisoned bait is disposed within and affixed to a portion of said inner void with the poisoned bait isolated from the external environment when said clamshell element is in said closed state and the poisoned bait being exposed to the external environment when said clamshell element is in said open state facilitated by said cylinder inner surface having been forcibly removed in a direction along said longitudinal axis from said clamshell element outer periphery, an elongated flexible member having a primary end portion and an opposing secondary end portion with a mid-portion positioned therebetween, said elongated flexible element is disposed between said cylinder inner surface and said clamshell element outer periphery with said primary end portion affixed to said cylinder and said secondary end portion affixed to said clamshell element outer periphery all while said clamshell element is in said closed state, wherein operationally when said clamshell element is not slidably engaged on said outer periphery and is clear from said cylinder inner surface said elongated flexible member acts as a flexible tether as between said cylinder and said clamshell element to create a distance between said cylinder and said clamshell element to enable a larger silhouette being of a combination of said cylinder, said elongated flexible member, and said clamshell element to enhance a potential for entanglement of said container apparatus in the selected thicket growth, said elongated flexible member is constructed of a planar strip of material that is wound about said clamshell outer periphery in a helical spiral form when said clamshell element is in said closed state, to operationally facilitate a longer length of said elongated flexible member thus increasing a length of said tether to further enhance a potential for entanglement in the selected thicket growth of a combination of said cylinder, said planar strip of material, and said clamshell element, a cover that is affixed to said first margin portion, wherein said clamshell element rests against and is in removable contact with said cover resulting in said cylinder second aperture remaining open while said clamshell element is in said closed state, operationally this is to cause said clamshell element to exit said cylinder therethrough said second aperture from said cylinder inner surface having been forcibly removed in a direction along said longitudinal axis from said clamshell element outer periphery with the purpose being to further ensure that said helical spiral form or said planar strip of material unwinds said helical spiral in a more tangle free manner, said cover is formed into a dome shape that projects inwardly toward said cylinder interior wherein said cover is disposed within a portion of said cylinder interior, wherein said cover is affixed to a portion of said cylinder inner surface, further said planar strip primary end portion is affixed to said cover, thus said cover axially positions said clamshell element in said closed state along said longitudinal axis, said clamshell element is completely enveloped within a portion of said cylinder interior causing a non-symmetric offset of said closed state clamshell element axial position along said longitudinal axis and about said rotational axis while said clamshell element is completely disposed within said portion of said cylinder interior, wherein operationally said clamshell element outer periphery is clear from said cylinder inner surface having been forcibly removed in a direction along said longitudinal axis from said clamshell element outer periphery therethrough said cylinder second aperture via said cylinder being rotated about said rotational axis wherein said non-symmetric offset through centrifugal force causes said clamshell element to dislodge from said cylinder un-spiraling said planar strip of material into said tether wherein a combination of said cylinder and said clamshell element separate from one another to help keep said tether into a substantially taut position thus helping to maximize a distance as between said cylinder and said clamshell element to further enhance said potential for entanglement in the selected thicket growth, of a combination of said cylinder, said tethered planar strip, and said clamshell element, said helical spiral form of said planar strip of material includes said helical spiral being wound onto said outer periphery in a direction progressing along said longitudinal axis from said second margin portion toward said first margin portion when said clamshell element is in said closed state, wherein operationally this is to further ensure said planar strip of material unwinds said helical spiral in a more tangle free manner when said clamshell element outer periphery is clear from said cylinder inner surface, said hinge is positioned in removable contact with said cover when said clamshell element is in said closed state, wherein operationally when said clamshell element exits said cylinder therethrough said second aperture said planar strip of material will unwind from said outer periphery progressively away from said hinge to keep said clamshell element in said closed state for an extended period of time outside of said cylinder due to said remaining helical spiral form of said planar strip of material wound onto said outer periphery keeping said clamshell element in said closed state, thus delaying said clamshell element being able to go into said open state until said tether is unwound into said taut position with the result that said tether is taut prior to said clamshell element being able to go into said open state to help maximize a span of said silhouette to further enhance a potential for entanglement of said container apparatus in the selected thicket growth; and (b) deploying said container apparatus such that said cylinder initially rotates about said rotational axis adjacent to the selected thicket growth.

14. A method of displacing a poisoned bait in a selected thicket growth in an external environment according to claim 13 wherein said deploying step further includes releasing said container apparatus from an aircraft flying over the selected thicket growth.

15. A method of displacing a poisoned bait in a selected thicket growth in an external environment according to claim 13 wherein said deploying step further includes releasing said container apparatus from a ground position adjacent to the